United States Patent
Sawada et al.

(10) Patent No.: US 10,994,619 B2
(45) Date of Patent: May 4, 2021

(54) CONTROL METHOD FOR ELECTRIC VEHICLE AND CONTROL DEVICE FOR ELECTRIC VEHICLE

(71) Applicant: NISSAN MOTOR CO., LTD., Kanagawa (JP)

(72) Inventors: Akira Sawada, Kanagawa (JP); Kengo Fujiwara, Kanagawa (JP); Shou Oono, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 314 days.

(21) Appl. No.: 16/095,042

(22) PCT Filed: Dec. 14, 2016

(86) PCT No.: PCT/JP2016/087265
§ 371 (c)(1),
(2) Date: Oct. 19, 2018

(87) PCT Pub. No.: WO2017/183231
PCT Pub. Date: Oct. 26, 2017

(65) Prior Publication Data
US 2019/0100114 A1 Apr. 4, 2019

(30) Foreign Application Priority Data

Apr. 19, 2016 (JP) .............................. JP2016-083820

(51) Int. Cl.
*B60L 9/00* (2019.01)
*G05D 1/00* (2006.01)
(Continued)

(52) U.S. Cl.
CPC ......... *B60L 15/2054* (2013.01); *B60L 3/0023* (2013.01); *B60L 15/20* (2013.01);
(Continued)

(58) Field of Classification Search
CPC .... B60L 15/2054; B60L 50/51; B60L 3/0023; B60L 15/2009; H02P 23/18; H02P 23/186
(Continued)

(56) References Cited

U.S. PATENT DOCUMENTS

2003/0000489 A1   1/2003 Majima et al.
2003/0158647 A1*  8/2003 Katakura ............ F02D 41/0205
                                              701/70
(Continued)

FOREIGN PATENT DOCUMENTS

JP   2002-152916 A   5/2002
JP   2003-336529 A   11/2003
(Continued)

OTHER PUBLICATIONS

English Translation for WO2013157315A1.*

*Primary Examiner* — Mahmoud S Ismail
(74) *Attorney, Agent, or Firm* — Osha Bergman Watanabe & Burton LLP

(57) ABSTRACT

A control method for an electric vehicle includes controlling a torque of a motor based on a final torque command value by calculating the final torque command value such that a vibration damping control to reduce vibrations of a driving force transmission system of a vehicle is performed on a target torque command value set based on vehicle information, calculating the final torque command value based on the target torque command value and a value obtained by multiplying a drive-shaft torsional angular velocity by a feedback gain, estimating, by use of a vehicle model that models the driving force transmission system, a dead-zone (Continued)

period during which a motor torque output from the motor is not transmitted to a drive-shaft torque of the vehicle, and determining whether or not the vehicle is just before stop of the vehicle.

11 Claims, 19 Drawing Sheets

(51) Int. Cl.
| | |
|---|---|
| G05D 3/00 | (2006.01) |
| G06F 7/00 | (2006.01) |
| G06F 17/00 | (2019.01) |
| B60L 15/20 | (2006.01) |
| H02P 23/18 | (2016.01) |
| B60W 30/20 | (2006.01) |
| B60L 50/51 | (2019.01) |
| B60L 3/00 | (2019.01) |

(52) U.S. Cl.
CPC ........... *B60L 15/2009* (2013.01); *B60L 50/51* (2019.02); *B60W 30/20* (2013.01); *H02P 23/18* (2016.02); *H02P 23/186* (2016.02); *B60L 2240/421* (2013.01); *B60L 2240/423* (2013.01); *B60L 2240/486* (2013.01); *B60L 2260/26* (2013.01); *B60L 2260/42* (2013.01); *B60L 2270/145* (2013.01); *Y02T 10/64* (2013.01); *Y02T 10/72* (2013.01)

(58) Field of Classification Search
USPC .......................................................... 701/22
See application file for complete search history.

(56) References Cited

U.S. PATENT DOCUMENTS

| | | |
|---|---|---|
| 2013/0184918 A1 | 7/2013 | Motosugi et al. |
| 2015/0112532 A1 | 4/2015 | Oono et al. |
| 2016/0297303 A1 | 10/2016 | Sawada et al. |
| 2017/0043677 A1* | 2/2017 | Ko .................. B60W 10/06 |

FOREIGN PATENT DOCUMENTS

| | | | |
|---|---|---|---|
| JP | 2007-107539 A | 4/2007 | |
| JP | 2007-255447 A | 10/2007 | |
| JP | 2012-029474 A | 2/2012 | |
| JP | 2013-223373 A | 10/2013 | |
| WO | 2013/157315 A1 | 10/2013 | |
| WO | WO-2013157315 A1 * | 10/2013 | ............. B60L 50/51 |
| WO | 2015/083213 A1 | 6/2015 | |

* cited by examiner

US 10,994,619 B2

CONTROL METHOD FOR ELECTRIC VEHICLE AND CONTROL DEVICE FOR ELECTRIC VEHICLE

CROSS-REFERENCE TO RELATED APPLICATIONS

The present application claims priority to Japanese Patent Application No. 2016-083820 filed Apr. 19, 2016, the contents of which are incorporated herein by reference in its entirety.

BACKGROUND

Technical Field

The present invention relates to a control method for an electric vehicle and a control device for an electric vehicle.

Related Art

In terms of an electric vehicle drivable by use of a torque from an electric motor, there has been conventionally known an electric vehicle control device for reducing vibrations of the vehicle by a feedback control using the rotation speed of the motor and the rotation speed of drive wheels (see JP 2002-152916 A). The electric vehicle control device reduces vibrations caused due to a torque change and the like of the vehicle such that a correction value is calculated by multiplying a predetermined gain and a deviation between an average rotation speed of the drive wheels and an equivalent rotation speed obtained by converting the rotation speed of the motor so as to correspond to the rotation speed of the drive wheels, and a motor torque is controlled according to a value obtained by subtracting the correction value from a torque command value of the motor.

SUMMARY OF INVENTION

In the meantime, in a case where the vehicle accelerates from a coast or deceleration, a dead-zone period during which a drive motor torque is not transmitted to a drive-shaft torque of the vehicle is generated due to backlash of gears.

In this regard, in the technique disclosed in JP 2002-152916 A, a shock caused when the gears are meshed again is restrained such that the drive motor torque is set to zero in the dead-zone period and the drive motor torque is increased at the timing when the gears are meshed again.

However, in a case where the vehicle slowly accelerates from a coast or deceleration, an increase slope of the torque command value of the motor becomes small, so that the timing when the gears are meshed again delays and the dead-zone period becomes long. On this account, in the technique disclosed in Patent Document 1 in which the drive motor torque is increased at the timing when the gears are meshed, the timing when the torque rises also delays due to the delay of the timing when the gears are meshed, which causes a delay in a response of the drive-shaft torque to a drive motor torque command.

One or more embodiments of the present invention can quicken a response of a drive-shaft torque in a gear backlash zone even in a case where a vehicle slowly accelerates from a coast or deceleration.

A control method for an electric vehicle according to one or more embodiments of the present invention is configured to control a torque of a motor based on a final torque command value by calculating the final torque command value such that a vibration damping control to reduce vibrations of a driving force transmission system of a vehicle is performed on a target torque command value set based on vehicle information, and includes: calculating the final torque command value based on the target torque command value and a value obtained by multiplying a drive-shaft torsional angular velocity by a feedback gain; and estimating, by use of a vehicle model that models the driving force transmission system, a dead-zone period during which a motor torque output from the motor is not transmitted to a drive-shaft torque of the vehicle. Different values as the feedback gain are set separately for the dead-zone period and for a period during which the motor torque is transmitted to the drive-shaft torque of the vehicle.

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
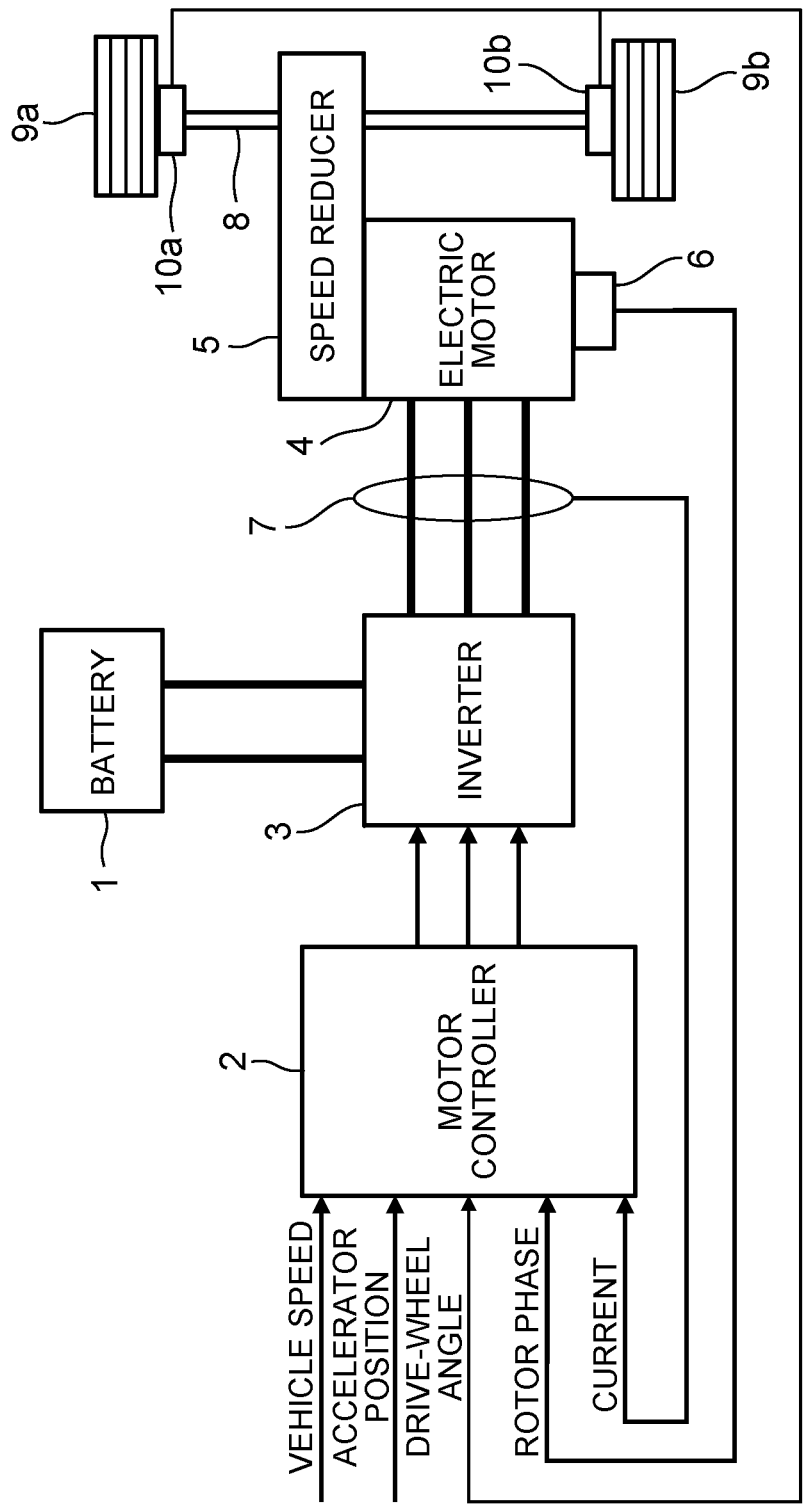
FIG. 1 is a block diagram illustrating a main configuration of an electric vehicle including a control device for the electric vehicle in a first embodiment.

FIG. 1 is a block diagram illustrating a main configuration of an electric vehicle including a control device for the electric vehicle in the first embodiment. The electric vehicle is an automobile including an electric motor as part or the entirety of a drive source for the vehicle and capable of traveling by a driving force of the electric motor, and the electric vehicle includes an electric automobile and a hybrid automobile.

Signals indicative of vehicle states such as a vehicle speed V, an accelerator position (accelerator opening degree) θ, a rotor phase α of an electric motor 4, drive-wheel rotation angles of drive wheels 9a, 9b, and currents iu, iv, iw of the electric motor 4 are input into a motor controller 2 as digital signals. The motor controller 2 generates a PWM signal to control the electric motor 4 based on the input signals. Further, the motor controller 2 generates a driving signal of an inverter 3 according to a PWM signal thus generated. Note that the motor controller 2 functions as a final torque command value calculation unit for calculating a final torque command value (described later), and a dead-zone period estimation unit for estimating a dead-zone period.

The inverter 3 turns on/off two switching elements (e.g., power semiconductor elements such as IGBT or MOS-FET) provided for each phase, so as to convert a direct current supplied from a battery 1 into an alternating current, so that a desired current flows into the electric motor 4.

The electric motor (three-phase alternating current motor) 4 (hereinafter just referred to as the motor 4) generates a driving force by the alternating current supplied from the inverter 3, so as to transmit the driving force to right and left drive wheels 9a, 9b via a speed reducer 5 and a drive shaft 8. Further, when the electric motor 4 rotates following the drive wheels 9a, 9b at the time of vehicle running, the electric motor 4 generates a regeneration driving force, so that the electric motor 4 recovers kinetic energy of the vehicle as electric energy. In this case, the inverter 3 converts an alternating current generated at the time of a regeneration operation of the motor 4 into a direct current and supplies it to the battery 1.

A current sensor 7 detects three-phase alternating currents iu, iv, iw flowing through the motor 4. Note that, since the sum of the three-phase alternating currents iu, iv, iw is 0, the currents of any two phases may be detected and the current of the remaining one phase may be obtained by calculation.

A rotation sensor 6 is a resolver or an encoder, for example, and detects a rotor phase α of the motor 4.

Wheel rotation sensors 10a, 10b are encoders, for example, and are attached to the right and left drive wheels 9a, 9b, respectively, so as to detect rotation angles of the drive wheels 9a, 9b.

Figure 2:
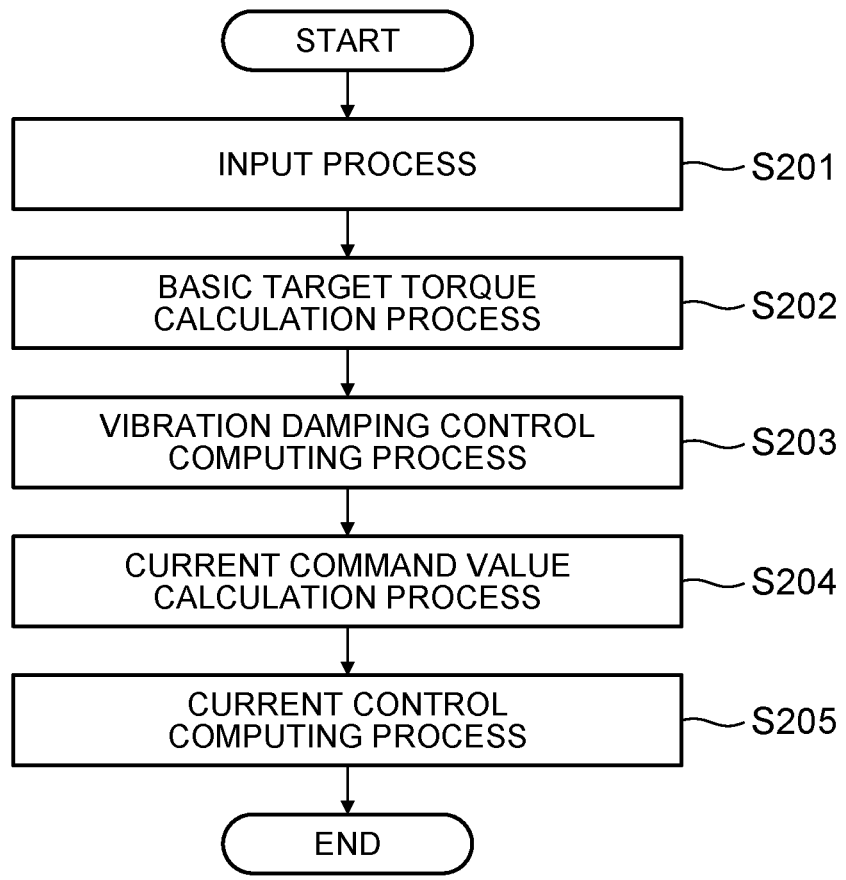
FIG. 2 is a flowchart illustrating a procedure of a process to be performed by a motor controller.

FIG. 2 is a flowchart illustrating a procedure of a process programmed to be performed by the motor controller 2. Processes of step S201 to step S205 are regularly performed at regular intervals while a vehicle system is activated.

In step S201, signals indicative of the vehicle states are input into the motor controller 2. Herein, the vehicle speed V (km/h), the accelerator position θ (%), the rotor phase α (rad) of the motor 4, the drive-wheel rotation angles (rad) of the drive wheels 9a, 9b, the rotation speed Nm (rpm) of the motor 4, the three-phase alternating currents iu, iv, iw flowing in the motor 4, and a direct-current voltage value Vdc (V) of the battery 1 are input.

The vehicle speed V (km/h) is acquired from a vehicle speed sensor (not shown) or another controller via communication. Alternatively, the motor controller 2 finds the vehicle speed V (km/h) such that a vehicle speed v (m/s) is found by multiplying a rotor mechanical angular velocity ωm by a tire dynamic radius r and then divided by a gear ratio of a final gear, and then the vehicle speed v (m/s) thus found is multiplied by 3600/1000 so as to convert its unit.

The accelerator position θ (%) is acquired from an accelerator position sensor (not shown) or is acquired from another controller such as a vehicle controller (not shown) via communication.

The rotor phase α (rad) of the electric motor 4 is acquired from the rotation sensor 6. The rotation speed Nm (rpm) of the motor 4 is found such that a rotator angular velocity ω (electric angle) is divided by a pole pair number p of the motor 4 to find a motor rotation angular velocity detection value ωm (rad/s) that is a mechanical angular velocity of the motor 4, and the motor rotation angular velocity detection value ωm thus found is multiplied by 60/(2π). The rotator angular velocity ω is found by differentiating the rotator phase α.

The drive-wheel rotation angles (rad) of the drive wheels 9a, 9b are acquired from the wheel rotation sensors 10a, 10b. A drive-wheel rotation angle θ$_w$ (rad) used in a vibration damping control computing process (described below) is found from an average value of values detected by the wheel rotation sensors 10a, 10b attached to the right and left drive wheels 9a, 9b. Further, the motor controller 2 differentiates the drive-wheel rotation angle θ$_w$ so as to calculate a drive-wheel rotation angular velocity ω$_w$, (rad/s).

The currents iu, iv, iw (A) flowing through the motor 4 are acquired from the current sensor 7.

The direct-current voltage value V$_{dc}$ (V) is detected by a voltage sensor (not shown) provided in a direct-current power source line between the battery 1 and the inverter 3. Note that the direct-current voltage value V$_{dc}$ (V) may be detected from a signal transmitted from a battery controller (not shown).

Figure 3:
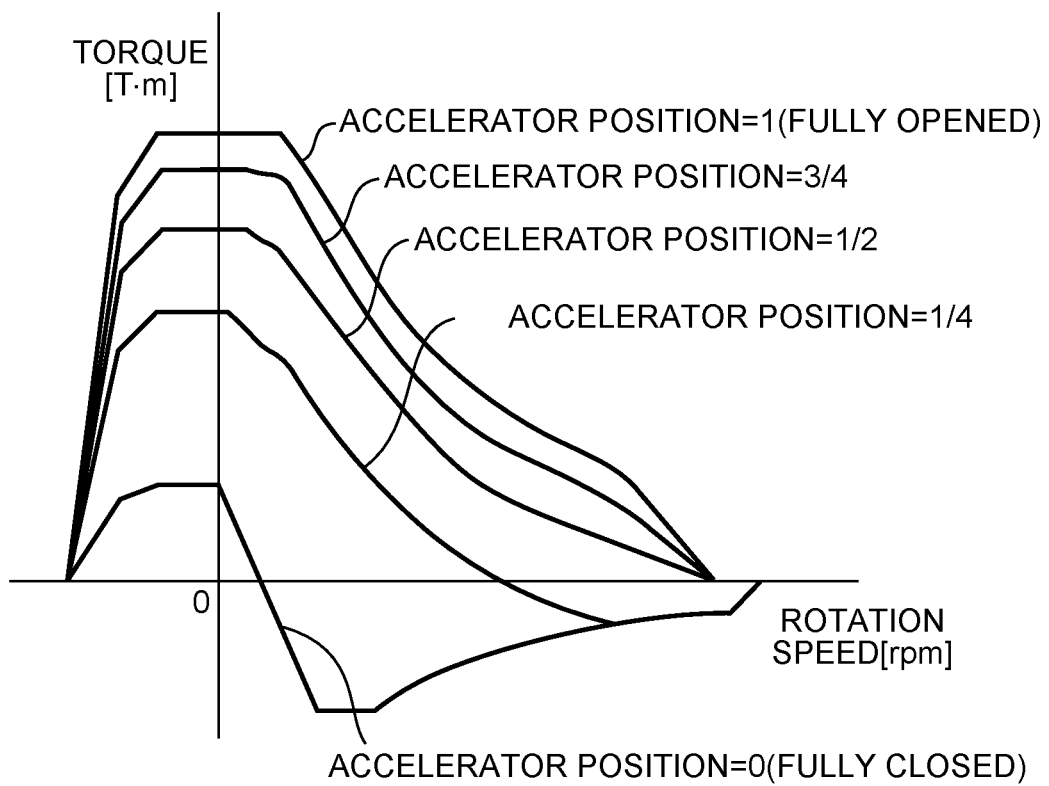
FIG. 3 is a view illustrating an example of an accelerator position-torque table.

In step S202, the motor controller 2 sets a target torque command value Tm* as a basic target torque. More specifically, the motor controller 2 sets the target torque command value Tm* by referring to an accelerator position-torque table illustrated in FIG. 3 based on the accelerator position θ and the vehicle speed V input in step S201. Note that the accelerator position-torque table is one example and is not limited to the one illustrated in FIG. 3.

In step S203, the vibration damping control computing process is performed. More specifically, a final torque command value Tmf* that reduces driving force transmission system vibrations (torsional vibrations and the like of the drive shaft 8) is set, without sacrificing the response of a drive-shaft torque, based on the target torque command value Tm* set in step S202, a drive-shaft torsional angular velocity, and a drive-shaft torsional angle estimated value as a dead-zone period determination value. Details of the vibration damping control computing process of setting the final torque command value Tmf* will be described later.

In step S204, a d-axis current target value id* and a q-axis current target value iq* are found based on the final torque command value Tmf* calculated in step S203, the motor rotation angular velocity detection value ωm, and the direct-current voltage value V$_{dc}$. For example, a table defining a relationship of the d-axis current target value and the q-axis current target value with the motor torque command value, the motor rotation speed, and the direct-current voltage value is prepared in advance, and the d-axis current target value id* and the q-axis current target value iq* are found by referring to this table.

In step S205, a current control is performed so that a d-axis current id and a q-axis current iq reach the d-axis current target value id* and the q-axis current target value iq* found in step S204, respectively. For this purpose, the d-axis current id and the q-axis current iq are first found based on the three-phase alternating current values iu, iv, iw and the rotator phase α of the motor 4 input in step S201. Subsequently, d-axis and q-axis voltage command values vd, vq are calculated from deviations between the d-axis and q-axis current command values id*, iq* and the d-axis and q-axis currents id, iq. Note that a non-interference voltage necessary to cancel out an interference voltage between d-q orthogonal coordinate axes may be added to the d-axis and q-axis voltage command values vd, vq thus calculated.

Subsequently, three-phase alternating-current voltage command values vu, vv, vw are found from the d-axis and q-axis voltage command values vd, vq and the rotator phase α of the motor 4. Further, PWM signals tu (%), tv (%), tw (%) are found from the three-phase alternating-current voltage command values vu, vv, vw thus found and the direct-current voltage value $V_{dc}$. By opening and closing the switching elements of the inverter 3 by the PWM signals tu, tv, tw found as such, the motor 4 can be driven with a desired torque instructed by the torque command value.

The following describes details of the vibration damping control computing process performed in step S203 in the control device for the electric vehicle of the first embodiment.

Figure 4:
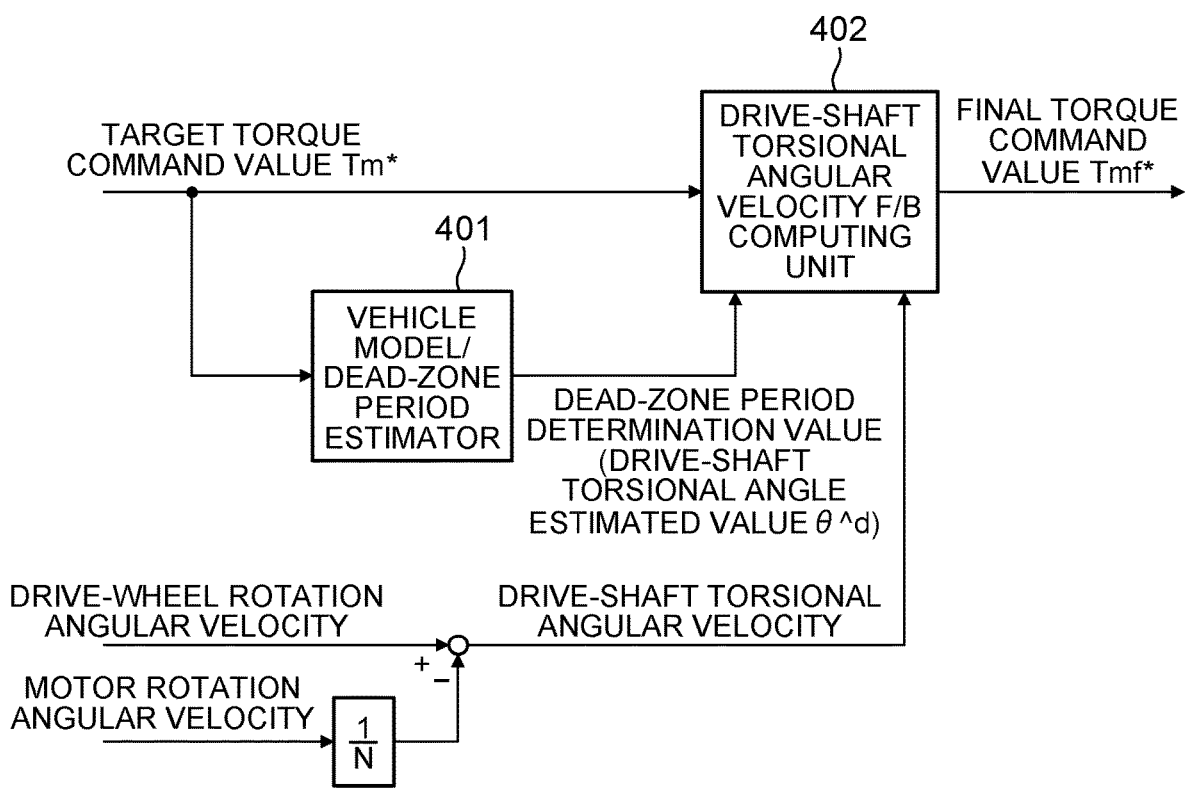
FIG. 4 is a control block diagram to implement a vibration damping control computing process in the first embodiment.

FIG. 4 is a block diagram to describe the vibration damping control computing process in the first embodiment. By performing the vibration damping control computing process on the target torque command value Tm*, the final torque command value Tmf* is set. The final torque command value Tmf* is calculated by use of a vehicle model/dead-zone period estimator 401 and a drive-shaft torsional angular velocity F/B computing unit 402.

The vehicle model/dead-zone period estimator 401 receives the target torque command value Tm* and calculates the drive-shaft torsional angle estimated value as the dead-zone period determination value serving as an index to determine whether the driving force transmission system of the vehicle is in a dead-zone period or not, and then, outputs the drive-shaft torsional angle estimated value to the drive-shaft torsional angular velocity F/B computing unit 402.

The drive-shaft torsional angular velocity F/B computing unit 402 calculates the final torque command value Tmf* based on the target torque command value Tm*, the drive-shaft torsional angle estimated value, and a drive-shaft torsional angular velocity calculated from a difference between the drive-wheel rotation angular velocity and a drive-shaft converted value of a motor rotation angular velocity.

Here, the drive-shaft converted value is calculated by dividing the motor rotation angular velocity by an overall gear ratio N (hereinafter just referred to as a gear ratio). Note that the motor rotation angular velocity (rad/s) is calculated by differentiating a motor rotation angle (rad) found by dividing the rotor phase α (electric angle) (rad) by the pole pair number of the electric motor.

Figure 5:
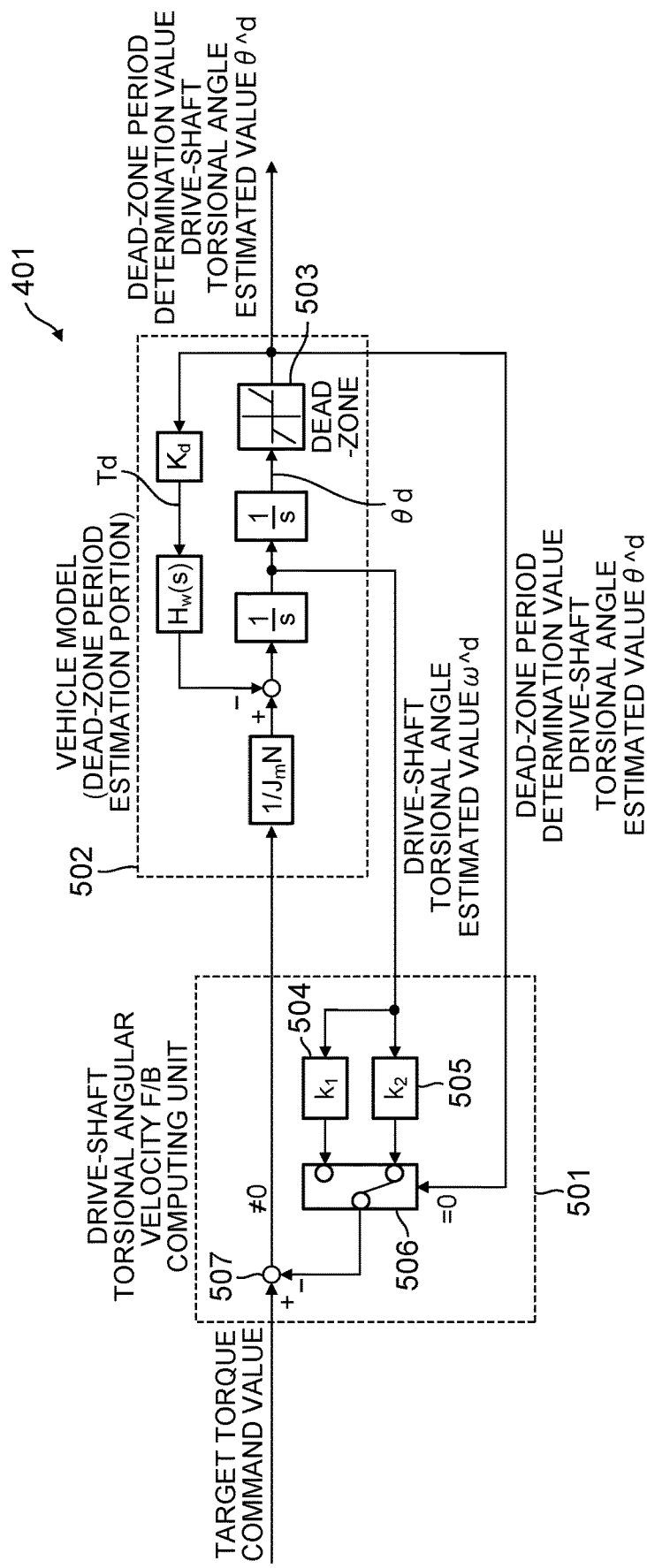
FIG. 5 is a control block diagram to describe details of a vehicle model/dead-zone period estimator illustrated in FIG. 4.

FIG. 5 is a block diagram to describe details of the vehicle model/dead-zone period estimator 401 illustrated in FIG. 4. The vehicle model/dead-zone period estimator 401 is constituted by a drive-shaft torsional angular velocity F/B computing unit 501 and a vehicle model 502. In the vehicle model/dead-zone period estimator 401, the target torque command value is input into the drive-shaft torsional angular velocity F/B computing unit 501 and an output value of the drive-shaft torsional angular velocity F/B computing unit 501 is input into the vehicle model 502. Hereby, a drive-shaft torsional angle estimated value θ^d as the dead-zone period determination value is calculated.

Figure 6:
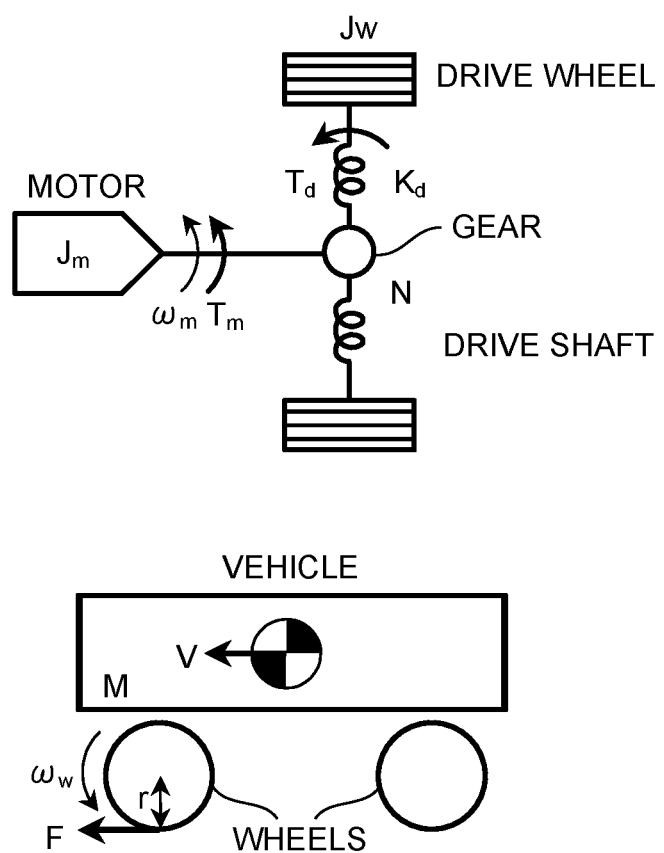
FIG. 6 is a view modeling a driving force transmission system of a vehicle.

First described is the vehicle model 502 more specifically, with reference to FIG. 6.

FIG. 6 is a view modeling the driving force transmission system of the vehicle and parameters in the figure are as described below.

$J_m$: motor inertia
$J_w$: drive-wheel inertia (for one shaft)
M: vehicle-body weight
$K_d$: torsional rigidity of drive system
$K_t$: coefficient relating to friction between tires and road surface
N: overall gear ratio
r: tire load radius
$\omega_m$: motor rotation angular velocity
$\theta_m$: motor rotation angle
$\omega_w$: drive-wheel rotation angular velocity
$\theta_w$: drive-wheel rotation angle
$T_m$: motor torque
$T_d$: drive-shaft torque
F: driving force (for two shafts)
V: vehicle-body speed
$\theta_d$: drive-shaft torsional angle From FIG. 6, equations of motion of the vehicle can be expressed by Equations (1) to (6) as follows.

Equation 1

$$J_m \cdot \dot{\omega}_m = T_m - T_d/N \quad (1)$$

Equation 2

$$2J_w \cdot \dot{\omega}_w = T_d - rF \quad (2)$$

Equation 3

$$M \cdot \dot{V} = F \quad (3)$$

Equation 4

$$T_d = K_d \cdot \theta_d \quad (4)$$

Equation 5

$$F = K_1 \cdot (r\omega_m - V) \quad (5)$$

Equation 6

$$\theta_d = \theta_m/N - \theta_w \quad (6)$$

Equations (1) to (6) are transformed by Laplace transformation so as to find a transfer characteristic from the motor torque Tm to the motor rotation speed $\omega_m$, as expressed by Equations (7), (8) as follows.

Equation 7

$$\omega_m = G_p(s) \cdot T_m \tag{7}$$

Equation 8

$$G_p(s) = \frac{1}{s} \cdot \frac{b_3 s^3 + b_2 s^2 + b_1 s + b_0}{a_3 s^3 + a_2 s^2 + a_1 s + a_0} \tag{8}$$

Note that $a_3$, $a_2$, $a_1$, $a0$, $b_3$, $b_2$, $b_1$, $b_0$ in Equation (8) can be expressed by Equation (9) as follows.

Equation 9

$$a_3 = 2J_m J_w M$$

$$a_2 K_1 J_m (2J_w + r^2 M)$$

$$a_1 = K_d M(J_m + 2J_w/N^2)$$

$$a_0 = K_d K_1(J_m + 2J_w/N^2 + r^2 M/N^2)$$

$$b_3 = 2J_w M$$

$$b_2 = K_1(2J_w + r^2 M)$$

$$b_1 = K_d M$$

$$b_0 = K_d K_t \tag{9}$$

Further, a transfer characteristic from the motor torque $T_m$ to the drive-shaft torque $T_d$ can be expressed by Equation (10).

Equation 10

$$\frac{T_d}{T_m} = \frac{c_1 s + c_0}{a_3 s^3 + a_2 s^2 + a_1 s + a_0} \tag{10}$$

Note that $c_1$, $c_2$ in Equation (10) can be expressed by Equation (11) as follows.

Equation 11

$$c_1 = 2K_d J_w M/N$$

$$c_0 = K_d K_t(2J_w + r^2 M)/N \tag{11}$$

When a transfer characteristic from the motor rotation speed $\omega_m$ to the drive-wheel rotation angular velocity $\omega_w$ is found from Equations (2), (4), (5), (6), it can be expressed by Equation (12) as follows.

Equation 12

$$\frac{\omega_w}{\omega_m} = \frac{b_1 s + b_0}{b_3 s^3 + b_2 s^2 + b_1 s + b_0} \cdot \frac{1}{N} \tag{12}$$

From Equations (7), (8), (12), a transfer characteristic from the motor torque $T_m$ to the drive-wheel rotation angular velocity $\omega_w$ can be expressed by Equation (13) as follows.

Equation 13

$$\frac{\omega_w}{T_m} = \frac{1}{N} \cdot \frac{1}{s} \cdot \frac{b_1 s + b_0}{a_3 s^3 + a_2 s^2 + a_1 s + a_0} \tag{13}$$

From Equations (10), (13), a transfer characteristic from the drive-shaft torque $T_d$ to the drive-wheel rotation angular velocity $\omega_w$ can be expressed by Equation (14) as follows.

Equation 14

$$\omega_w = \frac{1}{N} \cdot \frac{1}{s} \cdot \frac{b_1 s + b_0}{c_1 s + c_0} T_d \tag{14}$$

Here, when Equation (1) is transformed, it can be expressed by Equation (15) as follows.

Equation 15

$$\frac{\omega_m}{N} = \frac{1}{J_m N s} T_m - \frac{1}{J_m N^2 s} T_d \tag{15}$$

Accordingly, from Equations (14), (15), the drive-shaft torsional angular velocity $\omega_d$ can be expressed by Equation (16) as follows.

Equation 16

$$\omega_d = \frac{\omega_m}{N} - \omega_w = \frac{1}{J_m N s} T_m - \frac{1}{J_m N^2 s} T_d - \frac{1}{N} \cdot \frac{1}{s} \cdot \frac{b_1 s + b_0}{c_1 s + c_0} T_d$$

$$= \frac{1}{s} \cdot \left( \frac{T_m}{J_m N} - H_w(s) \cdot T_d \right) \tag{16}$$

Note that, $H_w(s)$ in Equation (16) can be expressed by Equation (17) as follows.

Equation 17

$$H_w(s) = \frac{v_1 s + v_0}{w_1 s + w_0} \tag{17}$$

Further, $v_1$, $v_0$, $w_1$, $w_0$ in Equation (17) are expressed by Equation (18) as follows.

Equation 18

$$v_1 = J_m N b_1 + c_1 = 2J_w MN(J_m + K_d/N^2)$$

$$v_0 = J_m N b_0 + c_0 = K_d K_t(2J_m N^2 + 2J_w + r^2 M)/N$$

$$w_1 = J_m N^2 c_1 = 2K_d J_m J_w MN$$

$$w_0 = J_m N^2 c_0 = K_d K_t J_m(2J_w + r^2 M)N \tag{18}$$

Further, Equation (10) can be transformed into Equation (19).

Equation 19

$$\frac{T_d}{T_m} = \frac{c_1 s + c_0}{a_3 s^3 + a_2 s^2 + a_1 s + a_0} = \frac{c_1}{a_3} \cdot \frac{s + c_0/c_1}{(s + \alpha)(s^2 + 2\zeta_p \omega_p s + \omega_p^2)} \quad (19)$$

Here, $\zeta_p$ in Equation (19) indicates an attenuation coefficient of a drive-shaft torque transmission system, and $\omega_p$ indicates a natural vibration frequency of the drive-shaft torque transmission system.

Further, when poles and zero points of Equation (19) are examined, $\alpha \approx c_0/c_1$ is found, and by performing pole-zero cancellation, Equation (20) is found as follows.

Equation 20

$$T_d = \frac{g_t}{s^2 + 2\zeta_p \omega_p s + \omega_p^2} T_m \quad (20)$$

Note that $g_t$ in Equation (20) can be expressed by Equation (21) as follows.

Equation 21

$$g_t = c_0/(a_3 \cdot \alpha) \quad (21)$$

Here, the final torque command value Tmf* can be expressed by Equation (22) as follows.

Equation 22

$$T_{mf}^* = T_m^* - k_1 \omega_d \quad (22)$$

Hereby, the final torque command value Tmf* can be replaced as Equation (23), from Equations (4), (6).

Equation 23

$$T_{mf}^* = T_m^* - (k_1 s) T_d / K_d \quad (23)$$

Then, when Equation (23) is substituted for Equation (20) with motor torque Tm=final torque command value Tmf* (Tm=Tmf*), Equation (20) can be arranged as Equation (24) as follows.

Equation 24

$$T_d = \frac{g_t}{s^2 + (2\zeta_p \omega_p + g_t k_1 / K_d)s + \omega_p^2} T_m^* \quad (24)$$

A model response from the motor torque to the drive-shaft torque can be expressed by Equation (25).

Equation 25

$$T_d = \frac{g_t}{s^2 + 2\zeta_r \omega_p s + \omega_p^2} T_m^* \quad (25)$$

When the model response is assumed Equation (25), a condition in which a transfer characteristic from the final torque command value Tmf* to the drive-shaft torque $T_d$ (Equation (24)) becomes the same as the model response is expressed by Equation (26) as follows.

Equation 26

$$k_1 = 2(\zeta_{r1} - \zeta_p) \omega_p K_d / g_t$$

$$k_2 = 2(\zeta_{r2} - \zeta_p) \omega_p K_d / g_t \quad (26)$$

Here, $\zeta_{r1}$ is an attenuation coefficient of a model response in a period (a region other than the dead-zone period) during which the motor torque is transmitted to the drive-shaft torque of the vehicle, and $\zeta_{r2}$ is an attenuation coefficient of a model response in the dead-zone period during which the motor torque is not transmitted to the drive-shaft torque of the vehicle. The attenuation coefficients are set to satisfy $\zeta_{r2} < \zeta_{r1}$ so that the response of the drive-shaft torque in the dead-zone period is faster than the response of the drive-shaft torque in the region other than the dead-zone period.

The vehicle model 502 is constituted by a dead zone model to which Equations (1) to (18) are applied so that vehicle parameters and gear backlash from the motor 4 to the drive shaft 8 are simulated. A drive-shaft torque Td obtained in consideration of the dead zone model is expressed by Equation (27).

Equation 27

$$T_d = \begin{cases} K_d(\theta_d - \theta_{dead}/2) & (\theta_d \geq \theta_{dead}/2) \\ 0 & (-\theta_{dead}/2 < \theta_d < \theta_{dead}/2) \\ K_d(\theta_d + \theta_{dead}/2) & (\theta_d \leq -\theta_{dead}/2) \end{cases} \quad (27)$$

Here, $\theta_{dead}$ indicates an overall gear backlash amount from the motor to the drive shaft.

The vehicle model 502 configured as such can calculate, based on the target torque command value, the drive-shaft torsional angle estimated value $\hat{\theta}_d$ as the dead-zone period determination value based on which it is possible to determine whether the driving force transmission system of the vehicle is in the dead-zone period or not.

More specifically, the drive-shaft torsional angle θd calculated based on the target torque command value is first input into a dead zone block 503 corresponding to the dead zone model. The dead zone block 503 outputs the drive-shaft torsional angle estimated value $\hat{\theta}_d$ as the dead-zone period determination value calculated according to the value of the input drive-shaft torsional angle θd, based on a domain (θd≥θ$_{dread}$, -θ$_{dead}$/2<θd<θ$_{dead}$/2, and θd ≤-θ$_{dead}$/2) of θd shown in Equation (27). Note that, in the first embodiment, the value of the drive-shaft torsional angle estimated value $\hat{\theta}_d$ output from the dead zone block 503 is calculated based on Equation (27), so the value takes any of θd-θ$_{dead}$/2, 0, and θd+θ$_{dead}$/2.

Further, in the first embodiment, when the drive-shaft torsional angle estimated value is 0, it is determined that the vehicle state is in the dead-zone period, and when the drive-shaft torsional angle estimated value is other than 0, it is determined that the vehicle state is in the region other than the dead-zone period. The drive-shaft torsional angle estimated value thus calculated is output to the drive-shaft torsional angular velocity F/B computing unit 402 illustrated in FIG. 4.

The details of the vehicle model 502 have been described as above. Next will be described the drive-shaft torsional angular velocity F/B computing unit 501.

The drive-shaft torsional angular velocity F/B computing unit 501 includes a feedback gain 504 (hereinafter also referred to as an F/B gain $k_1$), a feedback gain 505 (hereinafter also referred to as an F/B gain $k_2$), a gain switch 506, and a subtractor 507. The drive-shaft torsional angular velocity F/B computing unit 501 receives the target torque command value, the drive-shaft torsional angle estimated value, and a drive-shaft torsional angular velocity estimated value, and outputs a calculation value to the vehicle model 502.

The feedback gain 504 receives the drive-shaft torsional angular velocity estimated value and outputs, to the gain switch 506, a value calculated by multiplying the drive-shaft torsional angular velocity estimated value by the F/B gain $k_1$ calculated from the attenuation coefficient $\zeta_{r1}$ for the model response in the region other than the dead-zone period in Equation (26).

The feedback gain 505 receives the drive-shaft torsional angular velocity estimated value and outputs, to the gain switch 506, a value calculated by multiplying the drive-shaft torsional angular velocity estimated value by the F/B gain $k_2$ calculated from the attenuation coefficient $\zeta_{r2}$ for the model response in the dead-zone period in Equation (26).

The drive-shaft torsional angle estimated value as the dead-zone period determination value and respective outputs from the feedback gains 504 and 505 are input into the gain switch 506. Based on the drive-shaft torsional angle estimated value, the gain switch 506 outputs either one of the outputs from the feedback gains 504 and 505 into the subtractor 507.

Here, in the first embodiment, when the drive-shaft torsional angle estimated value is 0, it is determined that the vehicle state is in the dead-zone period, and when the drive-shaft torsional angle estimated value is other than 0, it is determined that the vehicle state is in the region other than the dead-zone period. Accordingly, when the drive-shaft torsional angle estimated value is other than 0, the gain switch 506 outputs a computing result of the feedback gain 504 to the subtractor 507, and when the drive-shaft torsional angle estimated value is 0, the gain switch 506 outputs a computing result of the feedback gain 505 to the subtractor 507.

The subtractor 507 subtracts the output value of the gain switch 506 from the target torque command value and outputs a calculated value to the vehicle model 502. Hereby, a value obtained by multiplying the drive-shaft torsional angular velocity estimated value fed back to the drive-shaft torsional angular velocity F/B computing unit 501 by either of respective gains to which the attenuation coefficients $\zeta_{r1}$, $\zeta_{r2}$ for the dead-zone period and for the region other than the dead-zone period are set separately is subtracted from the target torque command value, and a resultant value is output to the vehicle model 502.

In the vehicle model/dead-zone period estimator 401 configured as described above, the drive-shaft torsional angle estimated value based on which it can be determined whether the driving force transmission system of the vehicle is in the dead-zone period or not is calculated. The drive-shaft torsional angle estimated value thus calculated in the vehicle model 502 is output to the drive-shaft torsional angular velocity F/B computing unit 402.

Figure 7:
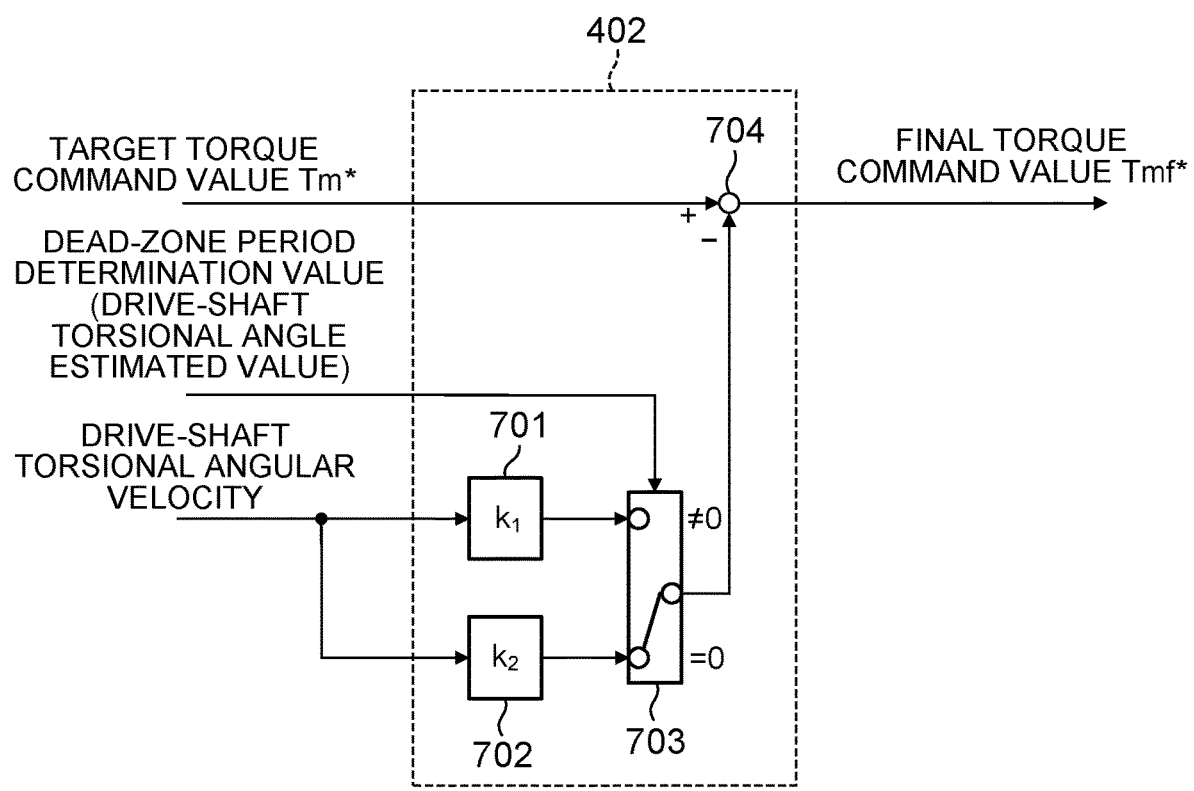
FIG. 7 is a control block diagram to describe details of a drive-shaft torsional angular velocity F/B computing unit illustrated in FIG. 4.

FIG. 7 is a control block diagram to describe details of the drive-shaft torsional angular velocity F/B computing unit 402 of the first embodiment. The drive-shaft torsional angular velocity F/B computing unit 402 includes a feedback gain 701 (hereinafter also referred to as an F/B gain $k_1$), a feedback gain 702 (hereinafter also referred to as an F/B gain $k_2$), a gain switch 703, and a subtractor 704. The drive-shaft torsional angular velocity F/B computing unit 402 receives the target torque command value, the drive-shaft torsional angle estimated value, and the drive-shaft torsional angular velocity, and outputs the final torque command value Tmf*.

The feedback gain 701 receives the drive-shaft torsional angular velocity and outputs, to the gain switch 703, a value calculated by multiplying the drive-shaft torsional angular velocity by the F/B gain $k_1$ calculated from the attenuation coefficient $\zeta_{r1}$ for the model response in the region other than the dead-zone period in Equation (26).

The feedback gain 702 receives the drive-shaft torsional angular velocity and outputs, to the gain switch 703, a value calculated by multiplying the drive-shaft torsional angular velocity by the F/B gain $k_2$ calculated from the attenuation coefficient $\zeta_{r2}$ for the model response in the dead-zone period in Equation (26).

The drive-shaft torsional angle estimated value as the dead-zone period determination value and respective outputs from the feedback gains 701 and 702 are input into the gain switch 703. Based on the drive-shaft torsional angle estimated value, the gain switch 703 outputs either one of the outputs from the feedback gains 701 and 702 to the subtractor 704.

Here, in the first embodiment, when the drive-shaft torsional angle estimated value is 0, it is determined that the vehicle state is in the dead-zone period, and when the drive-shaft torsional angle estimated value is other than 0, it is determined that the vehicle state is in the region other than the dead-zone period, as described in terms of the vehicle model/dead-zone period estimator 401. Accordingly, when the drive-shaft torsional angle estimated value is other than 0, the gain switch 703 outputs a computing result of the feedback gain 701 to the subtractor 704, and when the drive-shaft torsional angle estimated value is 0, the gain switch 703 outputs a computing result of the feedback gain 702 to the subtractor 704.

The subtractor 704 subtracts the output value of the gain switch 703 from the target torque command value so as to calculate the final torque command value Tmf*.

With such a configuration, it is estimated whether the driving force transmission system of the vehicle is in the dead-zone period or not, and a feedback gain in a feedback control system used for vibration damping control computation can be adjusted separately for a case where the vehicle state is in the dead-zone period and for a case where the vehicle state is in the region other than the dead-zone period, thereby making it possible to quicken only the response of the drive-shaft torque in a gear backlash zone.

More specifically, with the control device for the electric vehicle of the first embodiment, it is estimated whether the vehicle state is in the dead-zone period or not, and the attenuation coefficients $\zeta_{r1}$, $\zeta_{r2}$ can be set separately for the dead-zone period and for the region other than dead-zone period. By setting the feedback gain ($K_2$) for the dead-zone period to be smaller than the feedback gain ($K_1$) for the region other than the dead-zone period, the response of the drive-shaft torque to the motor torque command value in the dead-zone period can be quickened.

Here, a vibration damping control computing result by the control device for the electric vehicle of the first embodiment will be described with reference to FIG. 12.

Figure 12:
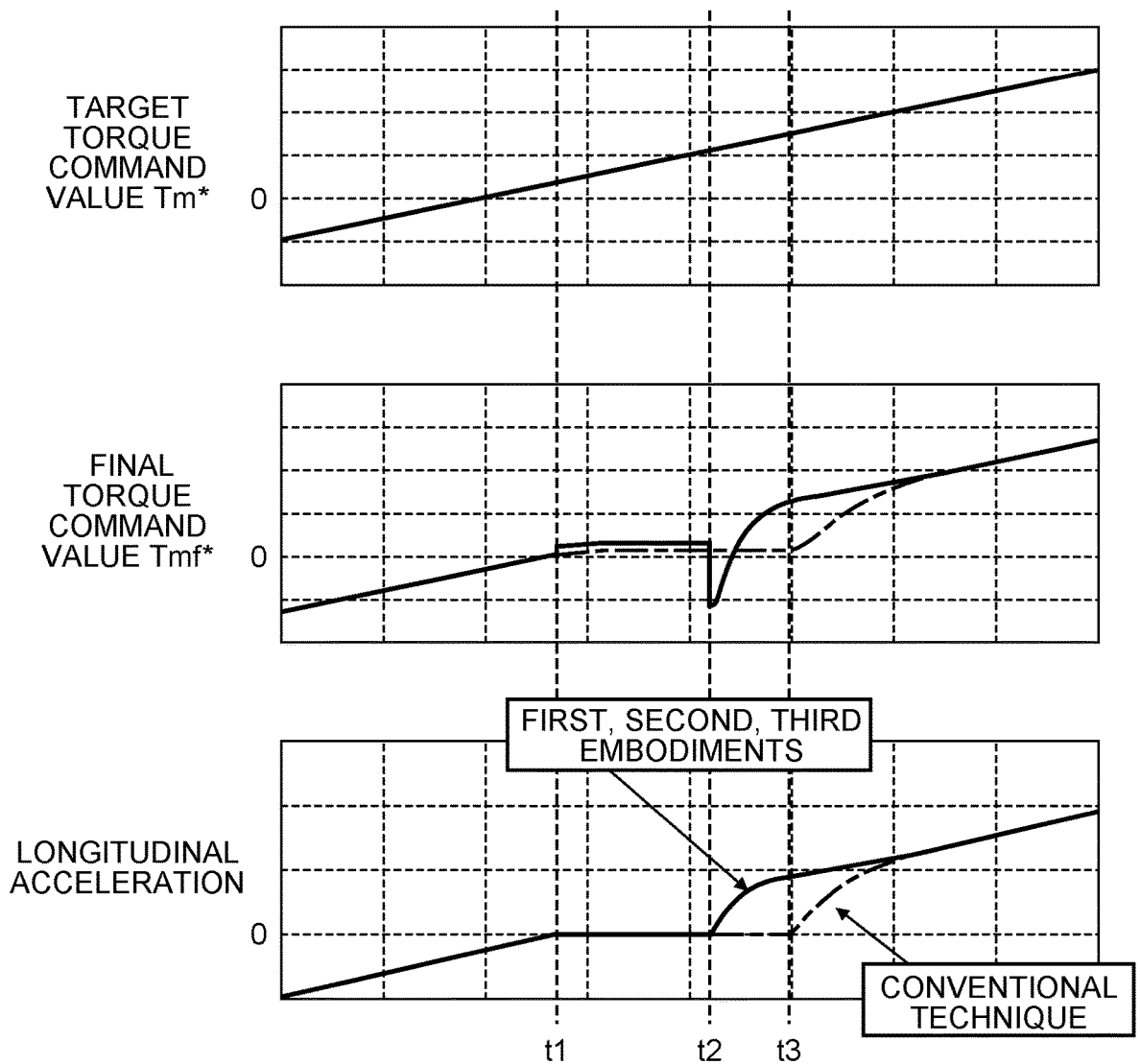
FIG. 12 is a view to describe control results by respective control devices for an electric vehicle of the first to third embodiments.

FIG. 12 is a comparison view of control results by the control device for the electric vehicle of the first embodiment and the after-mentioned second and third embodiments with a control result by a conventional technique. In the figure, the target torque command value, the final torque command value, and a vehicle longitudinal acceleration are shown in this order from the top. Note that a continuous line in the figure indicates the control results by the first to third embodiments, and an alternate long and short dash line indicates the control result by the conventional technique.

The results shown in FIG. 12 are the control results in such a case where the vehicle accelerates by increasing the target torque command value with a slow slope from a state where the vehicle decelerates by a regeneration torque.

In the conventional technique (the alternate long and short dash line), when the target torque command value is increased with a slow slope, the longitudinal acceleration reaches 0 due to gear backlash at time t1 and then increases again at time t3, and thus, the dead-zone period during which the longitudinal acceleration is 0 is long. This is because, in the conventional technique, the final torque command value is controlled to be increased at the timing when the gears are meshed.

In the control result (the continuous line) by the control device for the electric vehicle of the first embodiment, the longitudinal acceleration reaches 0 at time t1 and then increases again at time t2, so that the dead-zone period is largely shortened. The reason is as follows: in the above vibration damping control computing process, it is estimated whether the vehicle state is in the dead-zone period or not, and the feedback gain $k_2$ by which the drive-shaft torsional angular velocity is multiplied in the dead-zone period is set to a value smaller than the feedback gain $k_1$ to be multiplied in the region other than the dead-zone period. As a result, the response of the driving torque to the target torque command value in the dead-zone period is quickened, so that the dead-zone period is largely shortened as compared to the conventional technique.

Thus, the control device for the electric vehicle of the first embodiment is a control device for the electric vehicle for implementing a control device for the electric vehicle that is configured to control the torque of the motor based on the final torque command value Tmf* by calculating the final torque command value Tmf* such that a vibration damping control to reduce vibrations of the driving force transmission system of the vehicle is performed on the target torque command value set based on vehicle information, and the control device for the electric vehicle calculates the final torque command value Tmf* based on the target torque command value Tm* and a value obtained by multiplying the drive-shaft torsional angular velocity by the feedback gain, and estimates the dead-zone period during which the motor torque output from the motor 4 is not transmitted to the drive-shaft torque of the vehicle, by use of the vehicle model 502 that models the driving force transmission system. The values $k_1$, $k_2$ as the feedback gain are set separately for the period during which the motor torque is transmitted to the drive-shaft torque of the vehicle and for the dead-zone period. Hereby, the feedback gains $k_1$, $k_2$ can be set separately for a case where the vehicle state is in the region other than the dead-zone period and for a case where the vehicle state is in the dead-zone period. As a result, the response of the drive-shaft torque in the dead-zone period can be adjusted optionally, so that the dead-zone period can be shortened by quickening the response of the drive-shaft torque in the dead-zone period as compared to that in the region other than the dead-zone period.

Further, in the control device for the electric vehicle of the first embodiment, the drive-shaft torsional angular velocity is calculated from the deviation between the drive-wheel rotation angular velocity and the drive-shaft converted value of the motor rotation angular velocity. This can constitute the feedback control system of the drive-shaft torsional angular velocity based on the drive-wheel rotation angular velocity and a detection value of the motor rotation angular velocity.

Further, with the control device for the electric vehicle of the first embodiment, the feedback gain $k_2$ for the dead-zone period is set to a value smaller than the feedback gain $k_1$ for the period during which the motor torque is transmitted to the drive-shaft torque of the vehicle. Hereby, the response of the driving torque to the target torque command value in the dead-zone period is quickened, so that the dead-zone period is largely shortened as compared to the conventional technique.

Further, with the control device for the electric vehicle of the first embodiment, a delay element of the control system is added to the vehicle model. The delay element of the control system includes at least one of a time delay caused when the vehicle state is detected and a predetermined process is performed, a time delay required for computing until the final torque command value Tmf* is calculated from the target torque command value, and a time delay until the motor torque is actually generated to the final torque command value Tmf*. Hereby, in the vibration damping control computing process, the influence of time delays due to a control computing time, a sensor signal processing time, and a motor response delay can be compensated.

Second Embodiment

A control device for an electric vehicle of the second embodiment to be described below is different from the first embodiment described above in the processing method of the vibration damping control computation performed in step S203.

Figure 8:
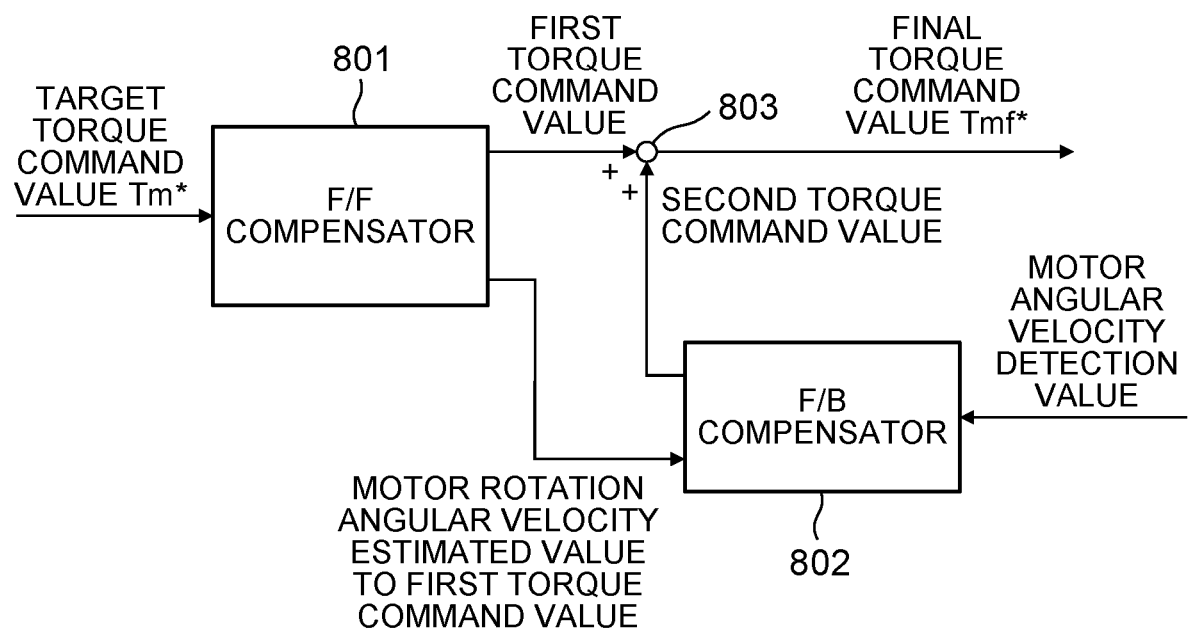
FIG. 8 is a control block diagram to implement a vibration damping control computing process in a second embodiment.

FIG. 8 is a control block diagram to describe a vibration damping control computing process in the second embodiment. The vibration damping control computing process of the second embodiment is performed by use of an F/F compensator 801, an F/B compensator 802, and an adder 803.

The F/F compensator 801 receives a target torque command value Tm* and calculates a first torque command value Tm1* and a motor rotation angular velocity estimated value $\hat{\omega}_m$ to the first torque command value Tm1*.

The F/B compensator 802 receives the motor rotation angular velocity estimated value $\hat{\omega}_m$ to the first torque command value Tm1* and a motor rotation speed detection value $\omega_m$ and calculates a second torque command value Tm2*.

The adder 803 adds the first torque command value Tm1* to the second torque command value Tm2* and outputs a final torque command value Tmf*.

Figure 9:
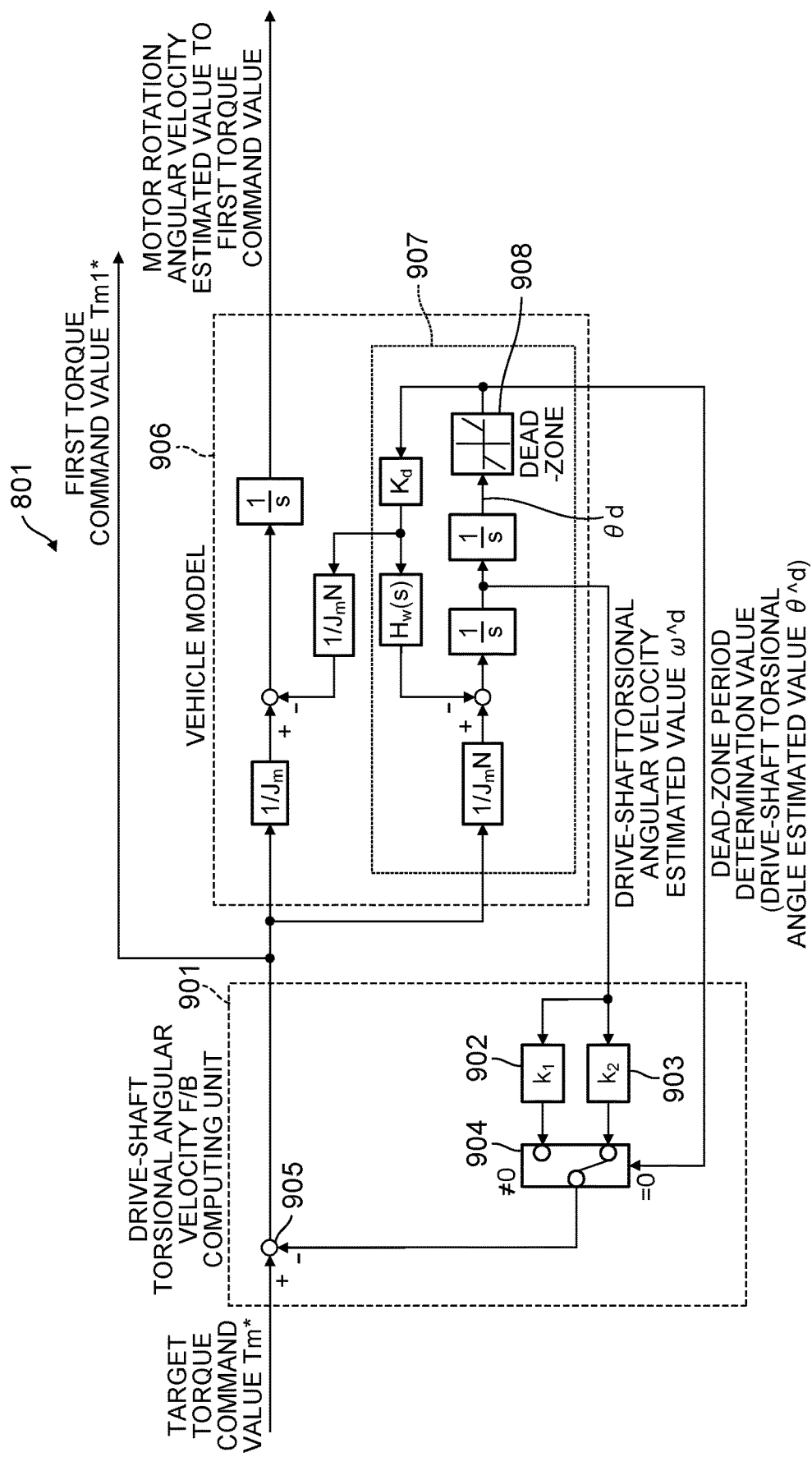
FIG. 9 is a view to describe details of an F/F compensator illustrated in FIG. 8.

FIG. 9 is a control block diagram to describe details of the F/F compensator 801 illustrated in FIG. 8. The F/F compensator 801 is constituted by a drive-shaft torsional angular velocity F/B computing unit 901 and a vehicle model 906.

The vehicle model 906 is constituted by a dead zone model to which Equations (1) to (18) are applied so that vehicle parameters and gear backlash from the motor 4 to the drive shaft 8 are simulated. Note that, in the vehicle model 906, a control block configuration of a dead-zone period estimation unit 907 for calculating a drive-shaft torsional angular velocity estimated value and a drive-shaft torsional angle estimated value as a dead-zone period determination value is similar to that of the vehicle model 502 described in the first embodiment. A drive-shaft torque Td obtained in consideration of a dead zone model illustrated as a dead zone block 908 is calculated by applying Equation (27).

In the second embodiment, when the first torque command value Tm1* is input into the vehicle model 906, the drive-shaft torsional angular velocity estimated value ω^d and the motor rotation angular velocity estimated value to the first torque command value Tm1* are calculated, and further, a drive-shaft torsional angle θd that is an integral value of the drive-shaft torsional angular velocity estimated value ωd is input into the dead zone block 908, so that the drive-shaft torsional angle estimated value ω^d is calculated. The drive-shaft torsional angle estimated value θ^d is used as a dead-zone period determination value serving as a determination index based on which it is determined whether the vehicle state is in the dead-zone period or not, similarly to the first embodiment.

The motor rotation angular velocity estimated value to the first torque command value Tm1*, output from the vehicle model 906, is input into the F/B compensator 802 (see FIG. 8), and the drive-shaft torsional angular velocity estimated value ω^d and the drive-shaft torsional angle estimated value θ^d are input into the drive-shaft torsional angular velocity F/B computing unit 901.

The drive-shaft torsional angular velocity F/B computing unit 901 includes a feedback gain 902 (an F/B gain $k_1$), a feedback gain 903 (an F/B gain $k_2$), a gain switch 904, and a subtractor 905. The drive-shaft torsional angular velocity F/B computing unit 901 receives the target torque command value, the drive-shaft torsional angular velocity estimated value ω^d, and the drive-shaft torsional angle estimated value θ^d and outputs a first torque command value.

The feedback gain 902 receives the drive-shaft torsional angular velocity estimated value ω^d and outputs, to the gain switch 904, a value calculated by multiplying the drive-shaft torsional angular velocity estimated value ω^d by the F/B gain $k_1$ calculated based on the attenuation coefficient $\zeta_{r1}$ for the model response in the region other than the dead-zone period by applying Equation (26).

The feedback gain 903 receives the drive-shaft torsional angular velocity estimated value ω^d and outputs, to the gain switch 904, a value calculated by multiplying the drive-shaft torsional angular velocity estimated value ω^d by the F/B gain $k_2$ calculated based on the attenuation coefficient $\zeta_{r2}$ for the model response in the dead-zone period by applying Equation (26).

The drive-shaft torsional angle estimated value and respective outputs from the feedback gains 902 and 903 are input into the gain switch 904. Based on the drive-shaft torsional angle estimated value as the dead-zone period determination value, either one of the outputs from the feedback gains 902 and 903 is output to the subtractor 905.

Note that, as described in the first embodiment, when the drive-shaft torsional angle estimated value is 0, it is determined that the vehicle state is in the dead-zone period, and when the drive-shaft torsional angle estimated value is other than 0, it is determined that the vehicle state is in the region other than the dead-zone period. Accordingly, when the drive-shaft torsional angle estimated value is other than 0, the gain switch 904 outputs a computing result of the feedback gain 902 to the subtractor 905, and when the drive-shaft torsional angle estimated value is 0, the gain switch 904 outputs a computing result of the feedback gain 903 to the subtractor 905.

The subtractor 905 subtracts the output value of the gain switch 904 from the target torque command value so as to calculate the first torque command value. The first torque command value is output to the adder 803 illustrated in FIG. 8.

Figure 10:
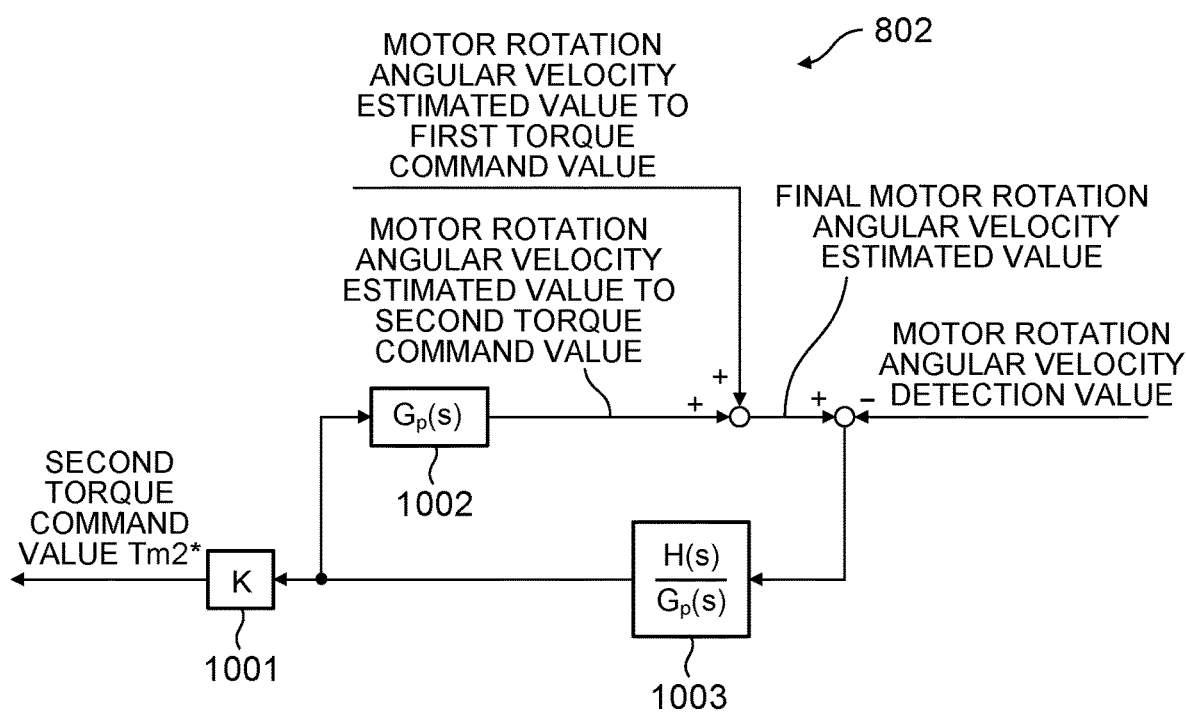
FIG. 10 is a view to describe details of an F/B compensator illustrated in FIG. 8.

FIG. 10 is a control block diagram illustrating details of the F/B compensator 802 illustrated in FIG. 8. The F/B compensator 802 is constituted by a gain 1001 (a gain K), a filter 1002, and a filter 1003.

The gain K is placed so as to adjust stability margin (gain margin, phase margin) of the feedback control system and is set to a value of 1 or less.

The filter 1002 is a filter having a transfer characteristic Gp(s) that simulates a transfer characteristic from a motor torque Tm to a motor rotation speed ωm. Equation (8) is applied to the transfer characteristic Gp(s).

The filter 1003 is a filter H(s)/Gp(s) constituted by an inverse system of the transfer characteristic Gp(s) and a bandpass filter H(s). The bandpass filter H(s) is set such that a damping property on a low-pass side is generally the same as a damping property on a high-pass side and a torsional resonance frequency $f_p$ of a driving system is closer to the central part of the passband on a logarithm axis (log scale).

For example, in a case where the bandpass filter H(s) is constituted by a primary high-pass filter and a primary low-pass filter, the bandpass filter H(s) is constituted as expressed by Equation (28) as follows.

Equation 28

$$H(s) = \frac{\tau_H s}{(1 + \tau_H s) \cdot (1 + \tau_L s)} \quad (28)$$

Note that $\tau_L = 1/(2\pi f_{HC})$, $f_{HC} = k \cdot f_p$, $\tau_H = 1/(2\pi f_{LC})$, $f_{LC} = f_p/k$ are satisfied. Further, the frequency $f_p$ indicates a torsional resonance frequency of the driving system and k indicates a given value constituting the bandpass.

Hereby, the F/B compensator 802 first calculates a final motor rotation angular velocity estimated value such that the motor rotation angular velocity estimated value to the first torque command value, calculated by the vehicle model 906 of the F/F compensator 801, is added to the motor rotation angular velocity estimated value to the second torque command value, calculated by inputting a second torque command value before multiplication by the gain K into the transfer characteristic Gp(s). Then, a deviation between the final motor rotation angular velocity estimated value and the motor rotation angular velocity detection value detected by the rotation sensor 6 is calculated and the filter H(s)/Gp(s) is applied to a calculated value, so that the second torque command value before multiplication by the gain K is calculated. Then, the second torque command value before multiplication by the gain K is multiplied by the gain K, so that the second torque command value is calculated.

As illustrated in FIG. 8, the first torque command value output from the F/F compensator 801 and the second torque command value output from the F/B compensator 802 are added up in the adder 803, so that the final torque command value Tmf* is calculated.

Even with the final torque command value Tmf* calculated as such, as shown by a control result in FIG. 12 (see the second embodiment), the response of the drive-shaft torque to the target torque command value in the dead zone region can be quickened, so that the dead-zone period can be largely shortened in comparison with the conventional technique, similarly to the control result by the control device for the electric vehicle of the first embodiment.

Thus, the control device for the electric vehicle of the second embodiment is configured such that: the drive-shaft torsional angular velocity is a drive-shaft torsional angular velocity estimated value that is estimated by use of the vehicle model 906 from the target torque command value; the drive-shaft torsional angle estimated value is calculated from the target torque command value by use of the vehicle model 906; and the final torque command value Tmf* is set based on the target torque command value, the drive-shaft torsional angle estimated value, and a value obtained by multiplying the drive-shaft torsional angular velocity estimated value by the feedback gain. Hereby, the first torque command value (a feedforward compensation value) is calculated from the drive-shaft torsional angle estimated value and the drive-shaft torsional angular velocity estimated value calculated by the vehicle model 906 included in the feedforward compensator 801, thereby making it possible to quicken the responsiveness of the drive-shaft torque without losing the stability of the feedback control system.

Further, with the control device for the electric vehicle of the second embodiment, the dead-zone period is estimated by use of the dead-zone period estimation unit 907 included in the vehicle model 906, and the drive-shaft torsional angular velocity estimated value ω^d is estimated by use of the dead-zone period estimation unit 907 included in the vehicle model 906. Hereby, at the time of reducing torsional vibrations by use of the drive-shaft torsional angular velocity estimated value ω^d, the estimation of the dead-zone period and the estimation of the drive-shaft torsional angular velocity can be calculated by use of a common part of the vehicle model (502, 906) that simulates the driving force transmission system of the vehicle, and therefore, in comparison with a case of calculating the drive-shaft torsional angular velocity based on another vehicle model or based on a detection value, a computation load can be reduced.

Third Embodiment

An control device for an electric vehicle of the third embodiment to be described below is different from the second embodiment described above in the configuration of the F/F compensator 801 used for the vibration damping control computing process performed in step S203. More specifically, the F/F compensator 801 of the third embodiment further includes a control system delay time adjuster 1109, and this is a difference from the second embodiment. In the third embodiment, since the control system delay time adjuster 1109 is provided, a control time delay caused due to a control system delay element can be taken into consideration with respect to a motor rotation speed estimated value to a first torque command value, output from a vehicle model 1106.

Figure 11:
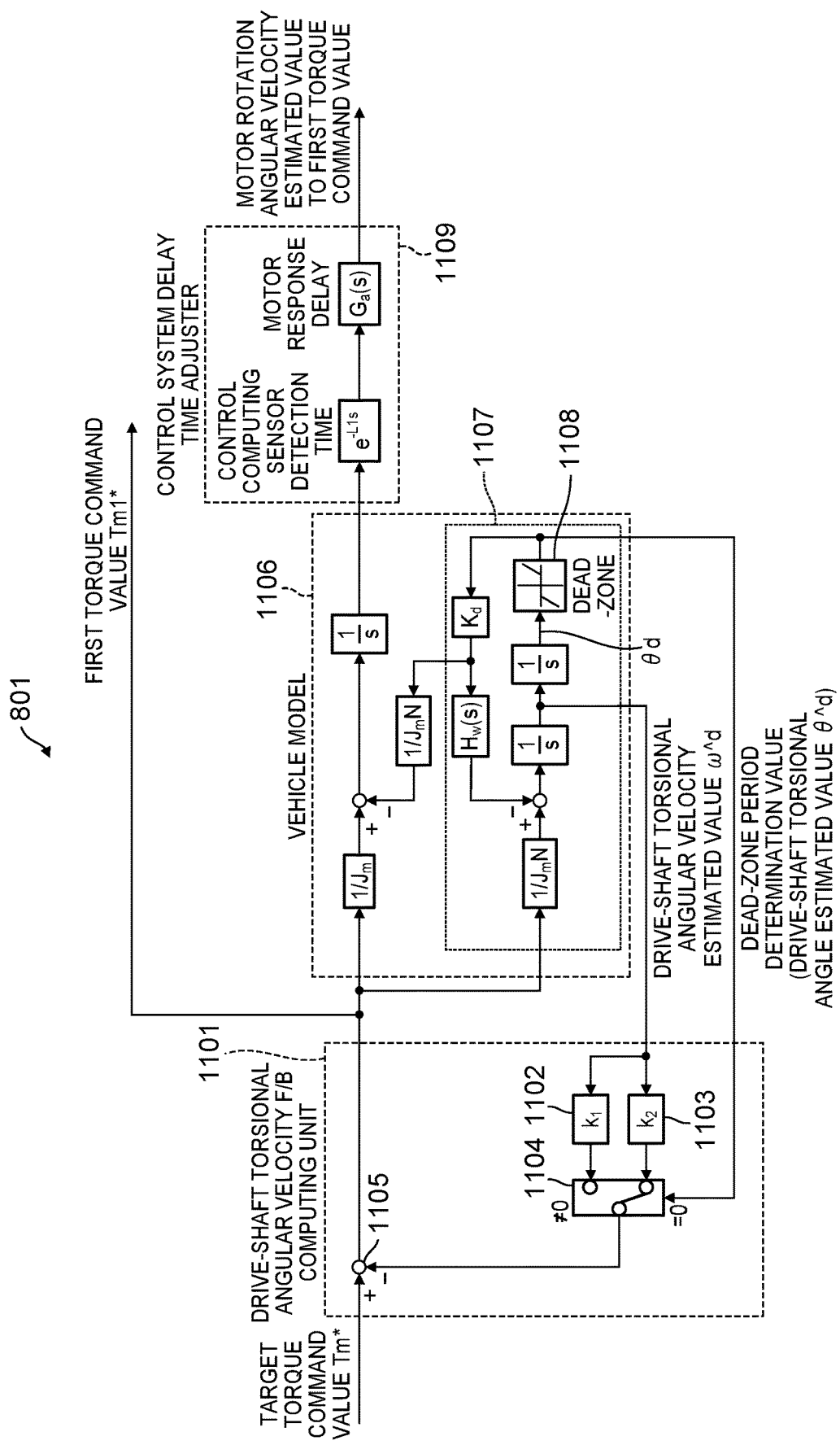
FIG. 11 is a view to describe details of an F/F compensator in a third embodiment.

FIG. 11 is a block diagram illustrating details of the F/F compensator 801 of the third embodiment. The F/F compensator 801 of the third embodiment is constituted by a drive-shaft torsional angular velocity F/B computing unit 1101, the vehicle model 1106, and the control system delay time adjuster 1109.

Similarly to the vehicle model 906 described in the second embodiment, the vehicle model 1106 is constituted by a dead zone model to which Equations (1) to (18) are applied so that vehicle parameters and gear backlash are simulated. Further, the vehicle model 1106 also includes a dead-zone period estimation unit 1107 corresponding to the dead-zone period estimation unit 907 of the second embodiment. A drive-shaft torque Td obtained in consideration of a dead zone model illustrated as a dead zone block 1108 is calculated by applying Equation (27).

The control system delay time adjuster 1109 includes a control computing sensor detection time $e^{-L_1 s}$ as a control computing time delay element and a sensor detection time delay element, and a motor response delay Ga(s), and the control system delay time adjuster 1109 delays a motor rotation angular velocity estimated value to the first torque command value, output from the vehicle model 1106, only by a predetermined time and outputs it to the F/B compensator 802. The motor response delay Ga(s) can be expressed by Equation (29) as follows.

Equation 29

$$G_a(s) = \frac{1}{\tau_a s + 1} \quad (29)$$

Here, τa indicates a motor response time constant.

Note that the control system delay time adjuster 1109 may be configured to include at least one time delay out of a sensor detection time delay caused when the vehicle state is detected and a predetermined process is performed, a control computing time delay required for computing until a final torque command value Tmf* is calculated from a target torque command value, and a motor response delay until a motor torque is actually generated to the final torque command value Tmf*.

The drive-shaft torsional angular velocity F/B computing unit 1101 is configured similarly to the drive-shaft torsional angular velocity F/B computing unit 901 of the second embodiment and includes a feedback gain 1102 (an F/B gain $k_1$), a feedback gain 1103 (an F/B gain $k_2$), a gain switch 1104, and a subtractor 1105. The drive-shaft torsional angular velocity F/B computing unit 901 receives the target torque command value, a drive-shaft torsional angular velocity estimated value ω^d, and a drive-shaft torsional angle estimated value θ^d and outputs a first torque command value.

As described in the second embodiment, when the drive-shaft torsional angle estimated value is other than 0, it is determined that the vehicle state is in a region other than a dead-zone period, and a computing result of the feedback gain 1102 is output to the subtractor 1105. When the drive-shaft torsional angle estimated value is 0, it is determined that the vehicle state is in the dead-zone period, and a computing result of the feedback gain 1103 is output to the subtractor 905. The subtractor 905 subtracts the output value of the gain switch 1104 from the target torque command value so as to calculate the first torque command value.

That is the configuration of the F/F compensator 801 according to the third embodiment. Similarly to the second embodiment, the first torque command value as the output of the F/F compensator 801 is added to a second torque target value output from the F/B compensator 802 in the adder 803, so that the final torque command value Tmf* is calculated. Even with the final torque command value Tmf* calculated as such, as shown by a control result in FIG. 12 (see the third embodiment in the figure), the response of the drive-shaft torque to the target torque command value in the dead zone region can be quickened, so that the dead-zone period can be largely shortened in comparison with the conventional technique, similarly to the control results by the control device for the electric vehicle of the first and second embodiments.

With the control device for the electric vehicle of the third embodiment, a delay element included in the control system is added to the vehicle model. The delay element of the control system includes at least one time delay out of a time delay caused when the vehicle state is detected and a predetermined process is performed, a time delay required for computing until the final torque command value Tmf* is calculated from the target torque command value, and a time delay until the motor torque is actually generated to the final torque command value Tmf*. Hereby, in the vibration damping control computing process, the influence of time delays due to a control computing time, a sensor signal processing time, and a motor response delay can be compensated.

Fourth Embodiment

An control device for an electric vehicle of the fourth embodiment to be described below is different from the first to third embodiments in that a disturbance torque applied to the motor 4 generally as a gradient resistance is estimated, a motor torque is caused to converge to a disturbance torque estimated value along with a decrease of a motor rotation speed, and a control (hereinafter referred to as a stop control process) to cause the motor rotation speed to converge to 0 is performed at the time when the vehicle is just before stop of the vehicle. The following mainly deals with differences from the first to third embodiments in terms of the control device for the electric vehicle of the fourth embodiment.

Figure 13:
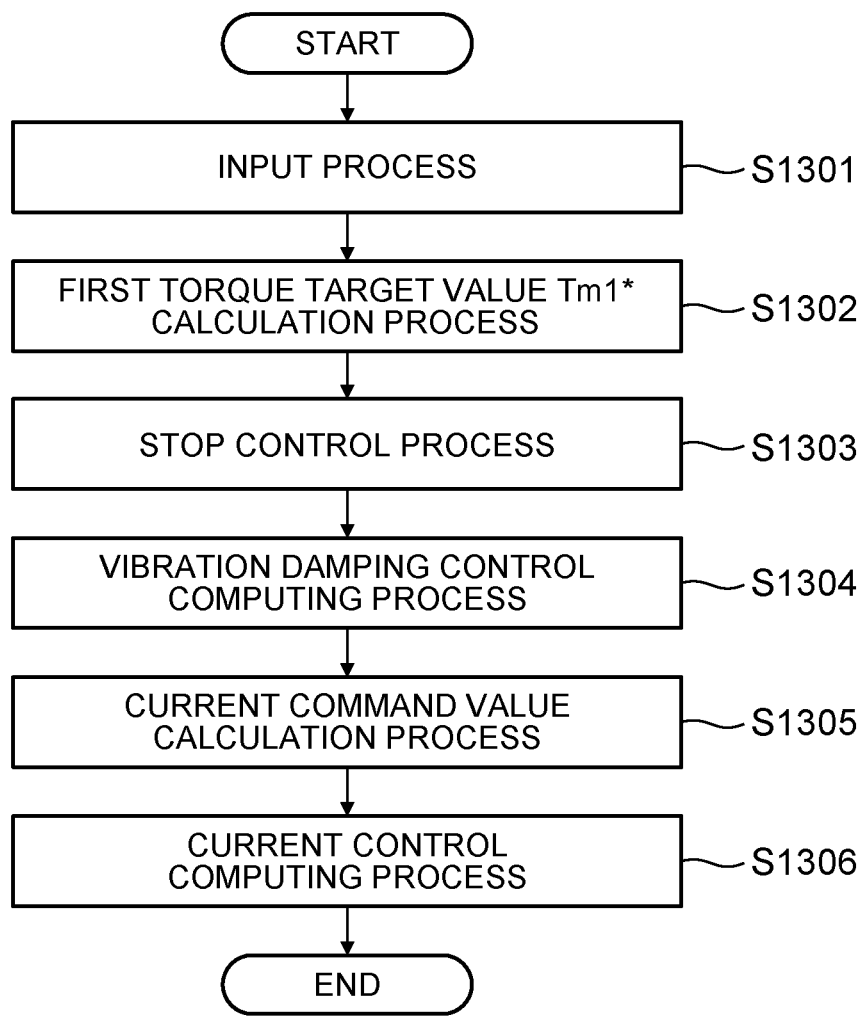
FIG. 13 is a flowchart illustrating a procedure of a process to be performed by a motor controller.

FIG. 13 is a flowchart illustrating a procedure of a process programmed to be performed by the motor controller 2 of the fourth embodiment. Processes of step S1301 to step S1306 are regularly performed at regular intervals while the vehicle system is activated.

Similarly to step S201 described in the first embodiment, signals indicative of vehicle states are input into the motor controller 2 in step S1301.

Figure 14:
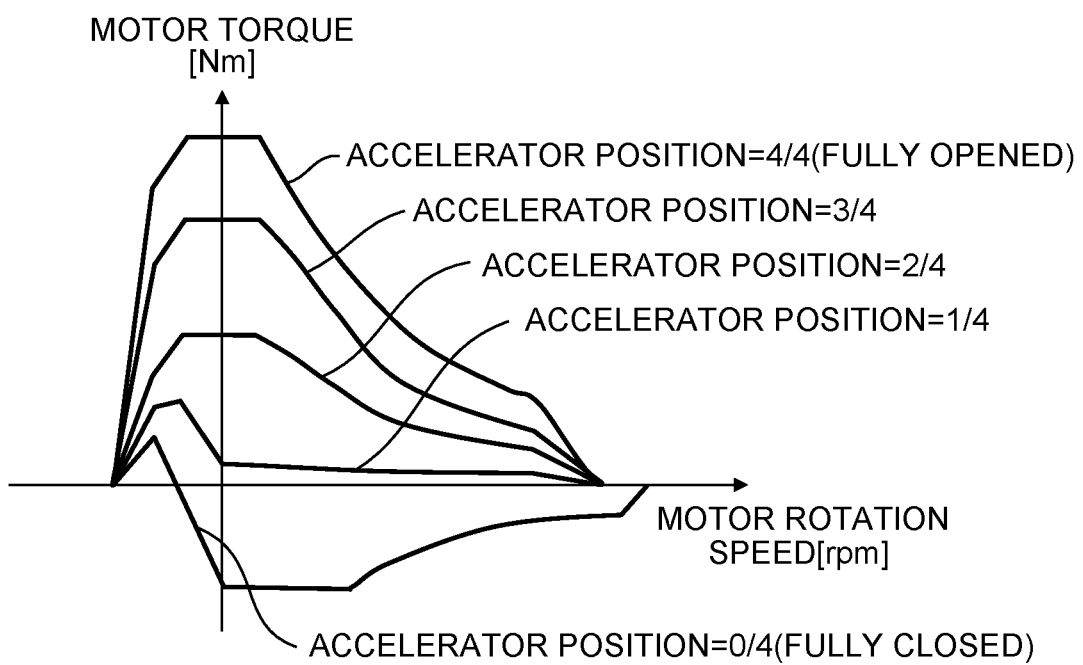
FIG. 14 is a view illustrating one example of an accelerator position-torque table.

In step S1302, the motor controller 2 calculates a first torque target value Tm1* as a basic target torque. More specifically, the motor controller 2 sets the first torque target value Tm1* by referring to an accelerator position-torque table illustrated in FIG. 14 based on an accelerator position θ and a vehicle speed V input in step S1301. Note that the accelerator position-torque table is one example and is not limited to the one illustrated in FIG. 14.

In step S1303, the motor controller 2 performs a stop control process. More specifically, it is determined whether or not the electric vehicle is just before the stop of the vehicle, and before the electric vehicle is just before the stop of the vehicle, the first torque target value Tm1* calculated in step S1302 is set as a third torque target value Tm3*. After the electric vehicle is just before the stop of the vehicle, a second torque target value Tm2* that converges to a disturbance torque estimated value Td along with a decrease of a speed parameter proportional to the running speed of the vehicle is set as the third torque target value Tm3* and a stop control determination flag FLG is set to 1. The second torque target value Tm2* is a positive torque on an uphill road, a negative torque on a downhill road, and almost zero on a flat road. Thus, a vehicle stop state can be maintained regardless of a gradient of a road surface as described later. Details of the stop control process will be described later. Note that, in the fourth embodiment, a motor rotation speed ωm is detected as the speed parameter.

In step S1304, the motor controller 2 performs a vibration damping control process. More specifically, based on the third torque target value Tm3* calculated in step S1303 and the motor rotation speed ωm, any of the vibration damping control processes (the control blocks illustrated in FIGS. 5, 9, and 11) described in the first to third embodiments is performed, so that a final torque command value Tmf* is calculated.

Note that, in the fourth embodiment, when the stop control determination flag FLG set in step S1303 is 1, the feedback gain for the dead-zone period in the vibration damping control process is set to the F/B gain $k_1$ calculated from the attenuation coefficient $\zeta_{r1}$ for the region other than the dead-zone period. That is, in the fourth embodiment, even when the vehicle state is in the dead-zone period and the drive-shaft torsional angle estimated value is 0, the same value as the F/B gain for the region other than the dead-zone period is set to the F/B gain for the dead-zone period during the stop control process. The final torque command value Tmf* is calculated based on a value obtained by multiplying the drive-shaft torsional angular velocity by the F/B gain $k_1$.

A current command value calculation process performed in step S1305 and a current control computing process performed in step S1306 are the same as a current command value calculation process in step S204 and a current control computing process in step S205 as described above, so that the descriptions thereof will be omitted in the fourth embodiment.

Here, before the stop control process performed in step S1303 is described, a transfer characteristic Gp(s) from a motor torque Tm to the motor rotation speed ωm will be described in the fourth embodiment.

When poles and zero points of the transfer function shown in Equation (8) are examined, they can be approximate to a transfer function expressed by Equation (30) as follows, and one pole and one zero point indicate values extremely close to each other. This is equivalent to that α and β in Equation (30) indicate values extremely close to each other.

Equation 30

$$G_p(s) = \frac{1}{s} \cdot \frac{(s+\beta) \cdot (b'_2 s^2 + b'_1 s + b'_0)}{(s+\alpha) \cdot (s^2 + 2\varsigma_p \omega_p s + \omega_p^2)} \tag{30}$$

Accordingly, by performing pole-zero cancellation (approximation to α=β) in Equation (8), Gp(s) constitutes a transfer characteristic of (second order)/(third order) as expressed by Equation (31) as follows.

Equation 31

$$G_p(s) = \frac{1}{s} \cdot \frac{b'_2 s^2 + b'_1 s + b'_0}{s^2 + 2\varsigma_p \omega_p s + \omega_p^2} \tag{31}$$

From the transfer characteristic Gp(s) and an algorithm of the vibration damping control, the transfer characteristic Gp(s) expressed by Equation (31) can be regarded as Gr(s) expressed by Equation (32) as follows.

Equation 32

$$G_r(s) = \frac{1}{s} \cdot \frac{b'_2 s^2 + b'_1 s + b'_0}{s^2 + 2\omega_p s + \omega_p^2} \quad (32)$$

<Stop Control Process>

Figure 15:
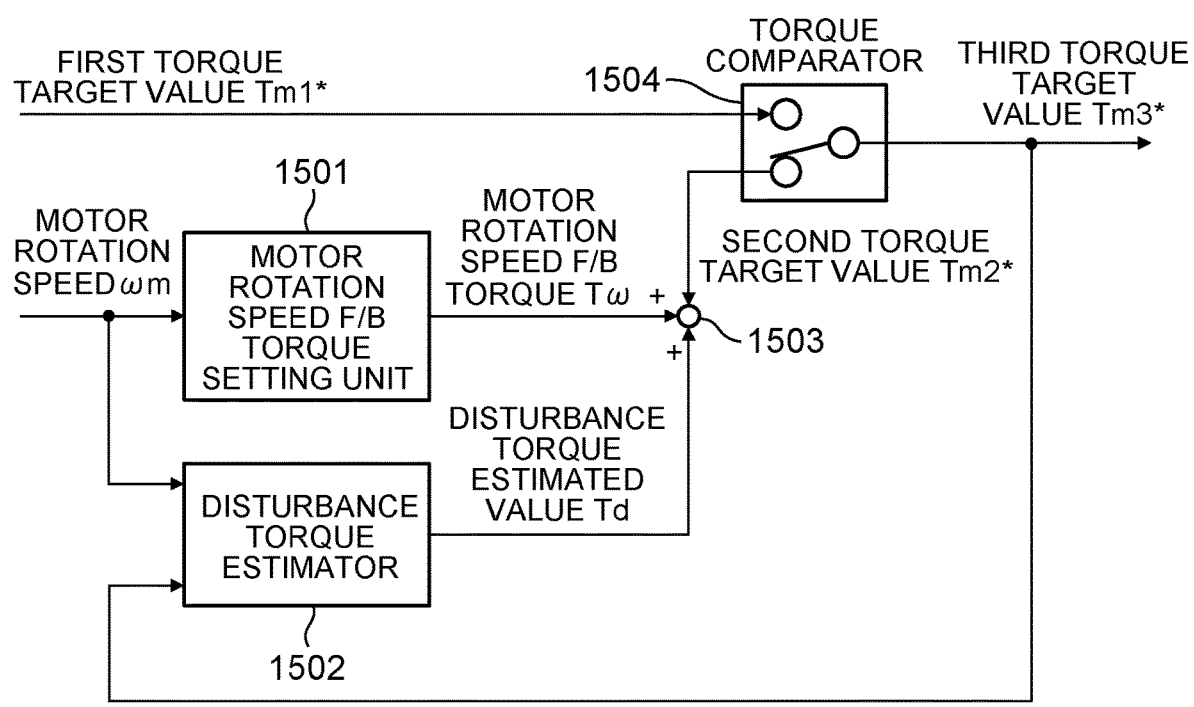
FIG. 15 is a control block diagram to implement a stop control process.

Details of the stop control process will be described with reference to FIG. 15. FIG. 15 is a control block diagram to implement the stop control process. The stop control process is performed by use of a motor rotation speed F/B torque setting unit 1501, a disturbance torque estimator 1502, an adder 1503, and a torque comparator 1504. The following describes their configurations in detail.

The motor rotation speed F/B torque setting unit 1501 calculates a motor rotation speed feedback torque (hereinafter referred to as a motor rotation speed F/B torque) Tω based on a detected motor rotation speed ωm. Details thereof will be described with reference to FIG. 16.

Figure 16:
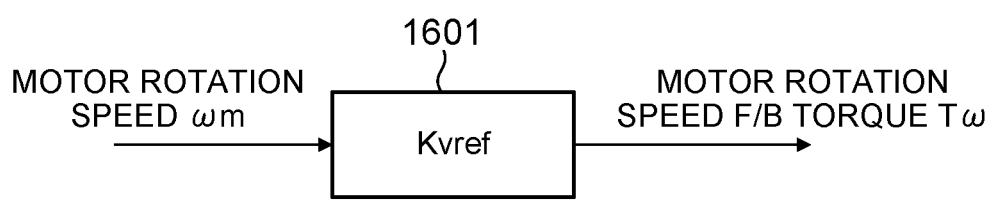
FIG. 16 is a control block diagram to describe details of a motor rotation speed F/B torque setting unit.

FIG. 16 is a view to describe a method for calculating the motor rotation speed F/B torque Tω based on the motor rotation speed ωm. The motor rotation speed F/B torque setting unit 1501 includes a multiplier 1601 and calculates the motor rotation speed F/B torque Tω by multiplying the motor rotation speed ωm by a gain Kvref. Note that Kvref is a negative (minus) value necessary to restrain a braking distance and to smoothly decelerate the electric vehicle and is set appropriately from experimental data and the like, for example. The motor rotation speed F/B torque Tω is set as a torque that can obtain a larger braking force as the motor rotation speed ωm is larger.

Note that, in the above description, the motor rotation speed F/B torque setting unit 1501 calculates the motor rotation speed F/B torque Tω by multiplying the motor rotation speed ωm by the gain Kvref, but may calculate the motor rotation speed F/B torque Tω by use of a regeneration torque table that defines a regeneration torque to the motor rotation speed ωm, a damping factor table in which a damping factor of the motor rotation speed ωm is stored in advance, and the like.

Now back to FIG. 15, the following continues the description. The disturbance torque estimator 1502 calculates a disturbance torque estimated value $T_d$ based on the detected motor rotation speed ωm and a motor torque command value Tm*. Details of the disturbance torque estimator 1502 will be described with reference to FIG. 17.

Figure 17:
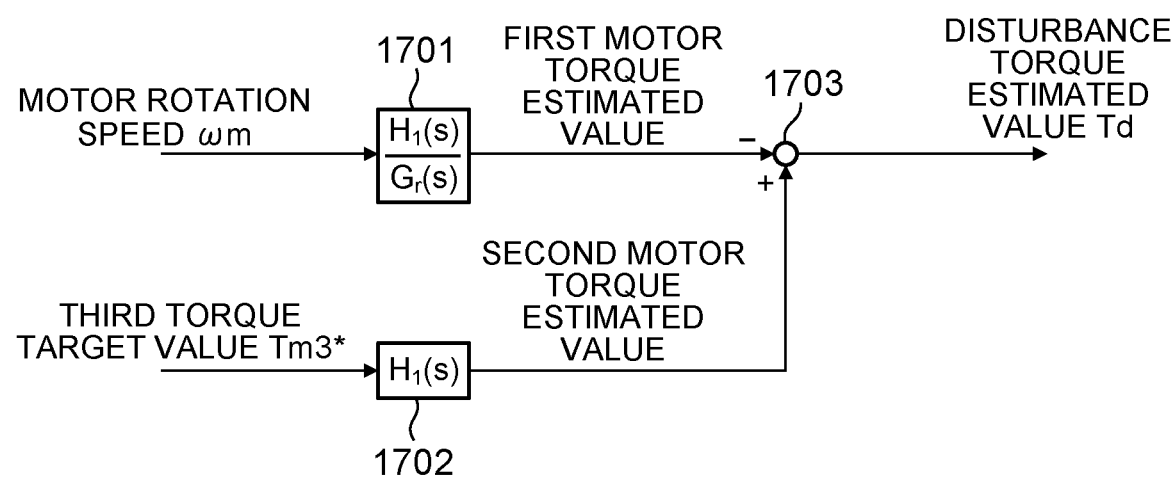
FIG. 17 is a control block diagram to describe details of a disturbance torque estimator.

FIG. 17 is a block diagram to describe a method for calculating the disturbance torque estimated value $T_d$ based on the third torque target value Tm3*, and the motor rotation speed ωm as the speed parameter proportional to the vehicle speed V. The disturbance torque estimator 1502 includes a control block 1701, a control block 1702, and an adder-subtractor 1703.

The control block 1701 functions as a filter having a transfer characteristic H1(s)/Gr(s), and receives the motor rotation speed ωm and performs filtering so as to calculate a first motor torque estimated value. Gr(s) is a model for a transfer characteristic from a torque input into the vehicle to the rotation speed of the motor and is expressed by Equation (32). H1(s) is a low-pass filter having such a transfer characteristic that a difference between the denominator degree and the numerator degree is equal to or more than a difference between the denominator degree and the numerator degree of a model Gr(s).

The control block 1702 functions as a low-pass filter having a transfer characteristic H1(s) and calculates a second motor torque estimated value such that the control block 1702 receives the motor torque command value Tm* and performs filtering thereon.

Then, the adder-subtractor 1703 subtracts the first motor torque estimated value from the second motor torque estimated value, so that the disturbance torque estimated value is calculated.

Note that, in the fourth embodiment, the disturbance torque is estimated by use of a disturbance observer illustrated in FIG. 17, but may be estimated by use of a measuring instrument such as G-sensors on the front and rear sides of the vehicle.

Here, an air resistance, a modeling error caused by a variation of a vehicle weight due to the number of occupants or load capacity, a rolling resistance of the tires, a gradient resistance of the road surface, and the like are thought as disturbances, but a disturbance factor dominant just before the stop of the vehicle is the gradient resistance. The disturbance factors differ depending on driving conditions, but the disturbance torque estimator 1502 calculates the disturbance torque estimated value Td based on the third torque target value Tm3*, the motor rotation speed ωm, the algorithm of the vibration damping control, and the transfer characteristic Gr(s) derived from the vehicle model Gp(s), thereby making it possible to estimate the disturbance factors collectively. This can stably achieve a smooth vehicle stop from deceleration under any driving condition.

Now back to FIG. 15, the following continues the description. The adder 1503 calculates the second torque target value Tm2* by adding the motor rotation speed F/B torque Tω calculated by the motor rotation speed F/B torque setting unit 1501 to the disturbance torque estimated value Td calculated by the disturbance torque estimator 1502.

The torque comparator 1504 compares the magnitude of the first torque target value Tm1* with the magnitude of the second torque target value Tm2* and sets a larger one of the torque target values as the third torque target value Tm3*. The second torque target value Tm2* is smaller than the first torque target value Tm1* during the travel of the vehicle, and when the vehicle decelerates and becomes just before the stop of the vehicle (the speed parameter proportional to the vehicle speed is equal to or less than a predetermined value), the second torque target value Tm2* becomes larger than the first torque target value Tm1*. Thus, when the first torque target value Tm1* is larger than the second torque target value Tm2*, the torque comparator 1004 determines that the vehicle is just before the stop of the vehicle and sets the third torque target value Tm3* to the first torque target value Tm1*. Further, when the second torque target value Tm2* becomes larger than the first torque target value Tm1*, the torque comparator 1004 determines that the vehicle is just before the stop of the vehicle, and performs the stop control process by switching the third torque target value Tm3* from the first torque target value Tm1* to the second torque target value Tm2*. Note that, in order to maintain the vehicle stop state, the second torque target value Tm2* is a positive torque on an uphill road, a negative torque on a downhill road, and converges to almost zero on a flat road.

Figure 18:
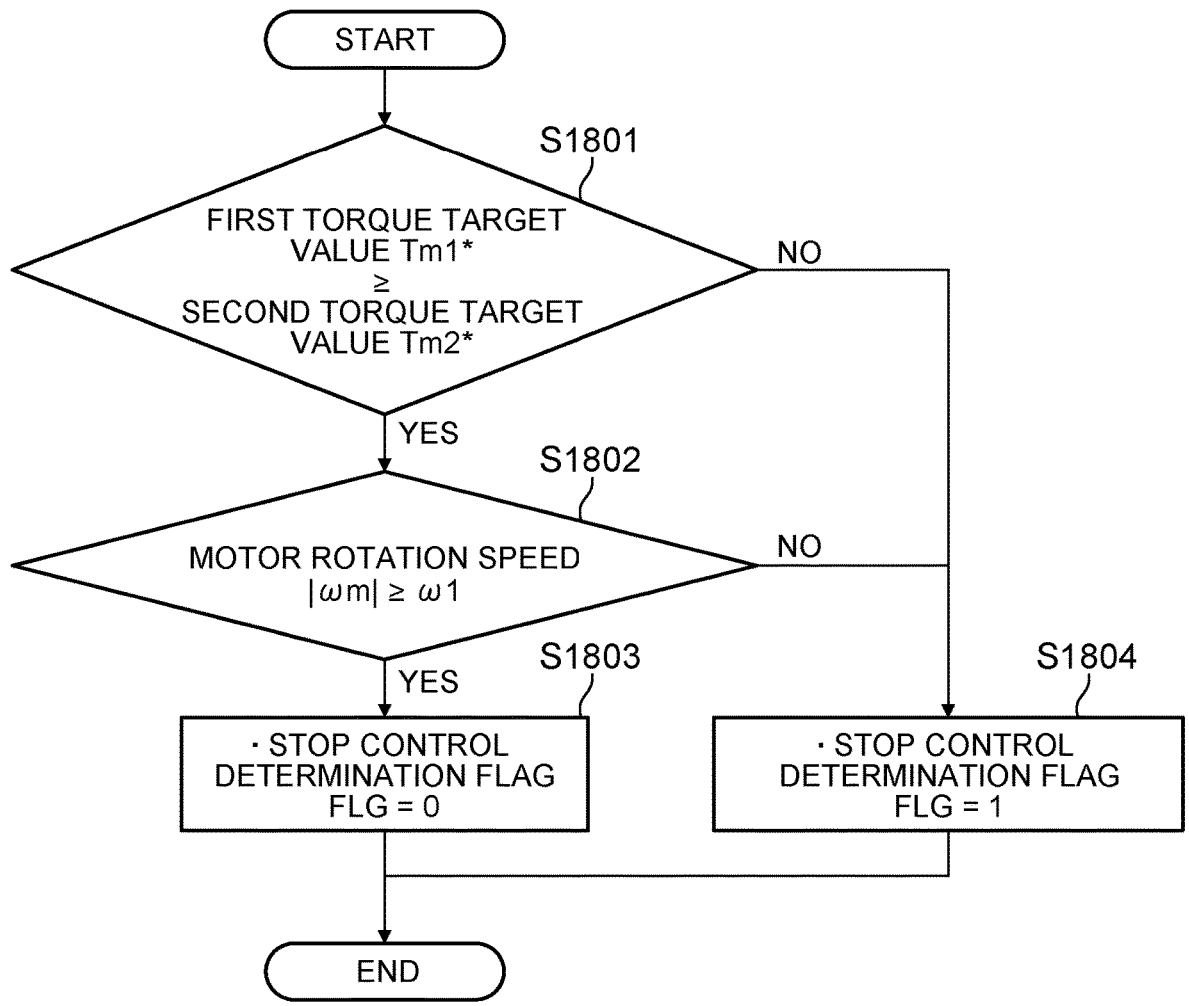
FIG. 18 is a flowchart for setting of a stop control determination flag FLG.

Next will be described setting of the stop control determination flag FLG with reference to FIG. 18. FIG. 18 is a flowchart illustrating a procedure of a process (a stop control determination process) for the setting of the stop control determination flag FLG. The stop control determination process is regularly performed at regular intervals by the motor controller 2 while the vehicle system is activated.

In step S1801, the motor controller 2 compares the first torque target value Tm1* with the second torque target value Tm2* so as to determine whether the vehicle is under a stop control or not. When the second torque target value Tm2* is the first torque target value Tm1* or less, it is determined that the vehicle is not under the stop control, and a process of step S1802 subsequent thereto is performed. When the second torque target value Tm2* is larger than the first torque target value Tm1*, it is determined that the vehicle is under the stop control, and a process of step S1804 of setting the stop control determination flag FLG to 1 is performed.

In step S1802, the motor controller 2 determines whether an absolute value of the motor rotation speed ωm is larger than a specified motor rotation speed ω 1 or not. The motor rotation speed ω 1 is a value specified in advance and is a value that achieves a low speed based on which it can be determined that the vehicle is just before the stop of the vehicle. When the absolute value of the motor rotation speed ωm is larger than the motor rotation speed ω 1, it is determined that the vehicle is not under the stop control, and a process of step S1803 of setting the stop control determination flag FLG to 0 is performed. When the motor rotation speed ωm is the motor rotation speed ω 1 or less, it is determined that the vehicle is under the stop control, and the process of step S1804 is performed.

In step S1803, the motor controller 2 sets the stop control determination flag FLG to 0 in response to the determination that the vehicle is not under the stop control, and ends the stop control determination process.

In step S1804, the motor controller 2 sets the stop control determination flag FLG to 1 in response to the determination that the vehicle is under the stop control, and ends the stop control determination process.

When the stop control determination flag FLG is 1, the F/B gain k2 for the dead-zone period and the F/B gain k1 for the region other than the dead-zone period in the vibration damping control process of step S1304 described with reference to FIG. 13 are set to the same value.

Hereby, while a vibration of the vehicle or an unstable control on the vehicle due to the feedback control performed in a dead zone region during the stop control is restrained, the vehicle can be stopped smoothly only by the motor torque and the vehicle stop state can be maintained.

Note that the setting of the stop control determination flag FLG to 1 does not necessarily require both of the determinations in step S1801 and step S1802, and the stop control determination flag FLG may be set to 1 only based on "NO" determination in step S1802. That is, when the absolute value of the motor rotation speed is smaller than the specified motor rotation speed ω 1, it may be determined that the vehicle is under the stop control. Although not illustrated herein, the motor torque may be adjusted along with a decrease of the motor rotation speed, and it may be determined whether a control to cause the motor torque to converge to the disturbance torque estimated value is performed or not. When the control is performed, it may be determined that the vehicle is under the stop control.

In the following description, an effect obtained when the control device for the electric vehicle of the fourth embodiment is applied to an electric vehicle will be described with reference to FIG. 19.

Figure 19:
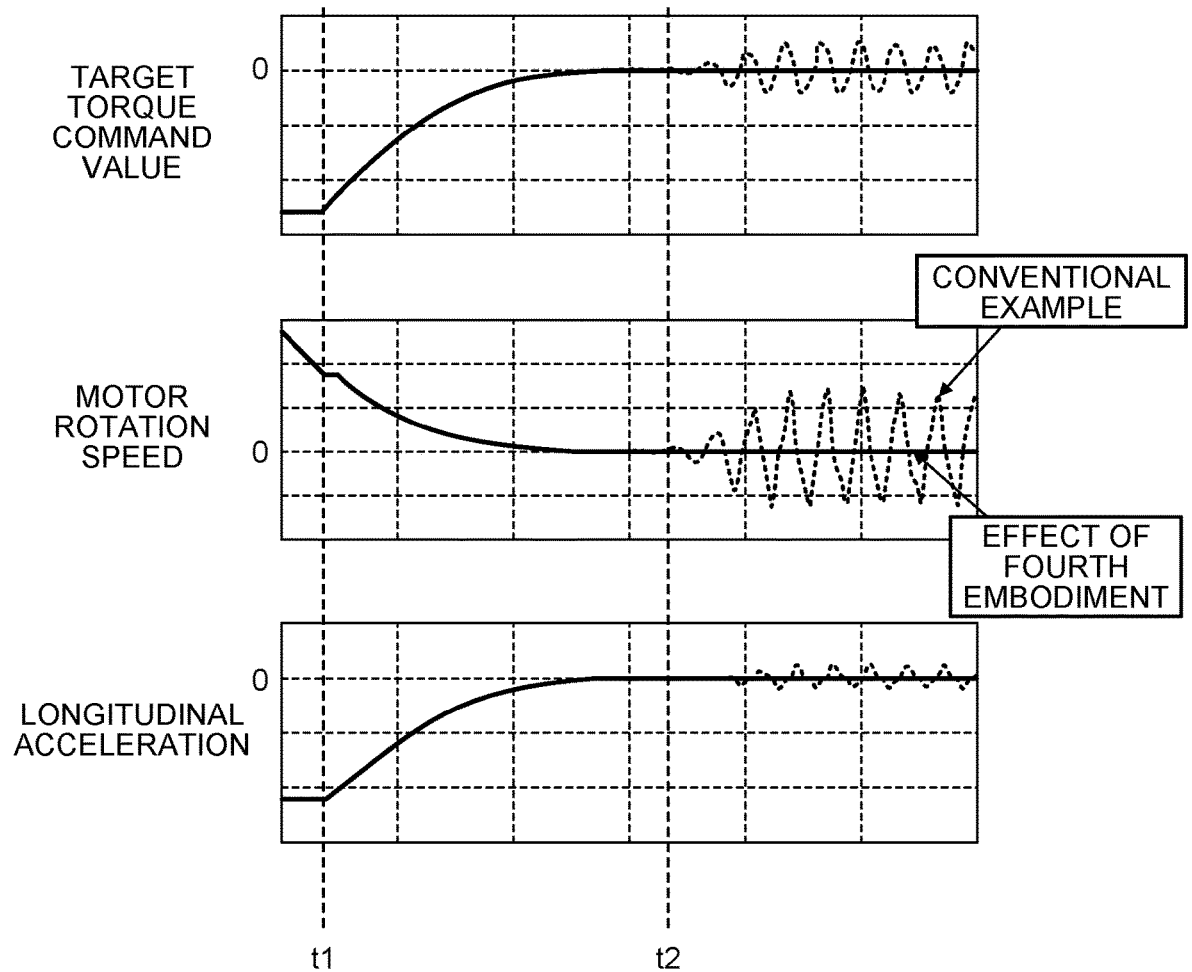
FIG. 19 is a time chart to describe a control result by a control device for an electric vehicle of a fourth embodiment.

FIG. 19 is a view to compare one example of a control result by the control device for the electric vehicle of the fourth embodiment with a control result by a conventional control. FIG. 19 illustrates a time chart in a case where the stop control process is performed on a flat road. A target torque command value, a motor rotation speed, and a vehicle longitudinal acceleration are shown in this order from the top, and a continuous line indicates the control result by the fourth embodiment and a dotted line indicates the control result by the conventional control.

At time t1, the stop control process is started and the stop control determination flag FLG is set to 1 in step S1804 in FIG. 18.

When the stop control process is performed from time t1 to t2, the motor rotation speed converges to 0 asymptotically. Then, after time t2, the motor rotation speed steps over 0 so that a dead-zone period is generated.

At this time, in the conventional control, the F/B gain for the dead-zone period is set to a value smaller than the F/B gain for a region other than the dead-zone period in the vibration damping control process, so that the final torque command value exhibits a high response to the target torque command value. Accordingly, even in a region stepping over the dead-zone period, a high-response feedback control is performed, so that continued vibrations are generated in the target torque command value. As a result, the motor rotation speed vibrates according to the target torque command value, so that vibrations that a driver feels are generated in a vehicle body.

On the other hand, in the control device for the electric vehicle of the fourth embodiment, even if a dead-zone period is generated after time t2, the same value is set for the F/B gains for the dead-zone period and for the region other than the dead-zone period, so that the final torque command value does not exhibit a high response to the target torque command value. As a result, as illustrated herein, continued vibrations generated when the vehicle is just before the stop of the vehicle on a flat road are reduced, so that vibrations of the target torque command value and the motor rotation speed are reduced, thereby making it possible to restrain generation of vibrations, in the vehicle body, that a driver feels.

Thus, with the control device for the electric vehicle of the fourth embodiment, it is determined whether or not the vehicle is just before the stop of the vehicle, and when the vehicle just before the stop of the vehicle, the feedback gains $k_1$, $k_2$ for a period during which the motor torque is transmitted to the drive-shaft torque of the vehicle and for the dead-zone period are set to the same value. Hereby, it is possible to reduce vibrations that can be generated in the vehicle body when the response of the motor torque to the motor torque command value becomes high after the vehicle is just before the stop of the vehicle.

Further, the control device for the electric vehicle of the fourth embodiment is configured such that: the first torque target value Tm1* as the target torque command value is calculated; the second torque target value that converges to the disturbance torque estimated value along with a decrease of the motor rotation speed is calculated; the magnitude of the first torque target value is compared with that of the second torque target value; and when the second torque target value is larger than the first torque target value, a value obtained by performing the vibration damping control process on the second torque target value is set as the final torque command value Tmf* and it is determined that the vehicle is just before the stop of the vehicle. Hereby, the value of the feedback gain can be set based on the timing to shift to the stop control process. Accordingly, only during the control to cause the motor torque to converge to the disturbance torque estimated value, the feedback gain $k_1$ for the region other than the dead-zone period can be set to have the same value as the feedback gain $k_2$ for the dead-zone period.

Further, the control device for the electric vehicle of the fourth embodiment may be configured such that: the disturbance torque applied to the motor is estimated; the speed parameter (the motor rotation speed in the fourth embodiment) proportional to the running speed of the electric vehicle is detected; and when the motor torque converges to the disturbance torque along with a decrease of the speed parameter, it is determined that the vehicle is just before the stop of the vehicle. Hereby, it can be detected that a feedback control to cause the motor torque command value to converge to the disturbance torque estimated value is being performed and a stop control is being performed in the dead-zone period stepping over backlash. Accordingly, it is possible to prevent the vehicle from vibrating during the stop control and the feedback control from being unstable during the stop control.

Further, the control device for the electric vehicle of the fourth embodiment may be configured such that: the speed parameter proportional to the running speed of the electric vehicle is detected; and when an absolute value of the speed parameter is a predetermined value or less, it is determined that the vehicle is just before stop of the vehicle. Hereby, an amount of computing relating to the determination on whether or not the stop control process is being performed can be reduced, thereby making it possible to reduce a computation load of software.

Embodiments of the present invention have been described above, but the embodiments are merely examples, and are not intended to limit the technical scope of the present invention to the specific configurations of the above embodiments.

For example, in the first to third embodiments, the drive-shaft torsional angle estimated value as the output value of the dead zone model (the dead zone blocks 503, 908, 1108) is calculated as the dead zone period determination value that is a criterion for the determination on whether the driving force transmission system of the vehicle is in the dead-zone period or not. When the drive-shaft torsional angle estimated value is 0, it is determined that the vehicle state is in the dead-zone period. However, the drive-shaft torsional angle estimated value is not necessarily used as the dead-zone period determination value, and θd (a drive-shaft torsional angle) that is an input value of the dead zone model may be used as the dead-zone period determination value. In that case, it is possible to determine whether the driving force transmission system of the vehicle is in the dead-zone period or not based on whether the drive-shaft torsional angle θd is within a predetermined threshold range or not. The threshold may be, for example, $-\theta_{dead}/2<\theta d<\theta_{dead}/2$, with reference to Equation (27).

Further, in the drive-shaft torsional angular velocity F/B computing unit described with reference to FIGS. 5, 7, 9, 11, a position where the feedback gains $k_1$, $k_2$ are applied to the drive-shaft torsional angular velocity estimated value may be replaced with a position where the drive-shaft torsional angular velocity estimated value to which the gains are applied is input into the gain switch. In that case, the drive-shaft torsional angular velocity estimated value is input into the gain switch first. When the dead-zone period determination value is other than 0, the gain switch outputs the drive-shaft torsional angular velocity estimated value to the feedback gain $k_1$, and when the dead-zone period determination value is 0, the gain switch outputs the drive-shaft torsional angular velocity estimated value to the feedback gain $k_2$. Note that respective outputs from the feedback gains $k_1$, $k_2$ are output to the subtractor and are subtracted from the target torque command value. When the drive-shaft torsional angular velocity F/B computing unit is configured as such, it is possible to reduce a computation load in the motor controller 2.

Further, in the fourth embodiment described above, the motor rotation speed converges to 0 during the stop control, but a value to which the motor rotation speed converges is not limited to 0 and may be a positive or negative value, provided that the value is a constant value.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control method for an electric vehicle, comprising:
   controlling a torque of a motor based on a final torque command value by calculating the final torque command value such that a vibration damping control to reduce vibrations of a driving force transmission system of a vehicle is performed on a target torque command value set based on vehicle information;
   calculating the final torque command value based on the target torque command value and a value obtained by multiplying a drive-shaft torsional angular velocity by a feedback gain;
   estimating, by use of a vehicle model that models the driving force transmission system, a dead-zone period during which a motor torque output from the motor is not transmitted to a drive-shaft torque of the vehicle;
   determining whether or not the vehicle is just before stop of the vehicle;
   setting different values as the feedback gain separately for the dead-zone period and for a period during which the motor torque is transmitted to the drive-shaft torque of the vehicle; and
   setting, when the vehicle is just before the stop of the vehicle, the same value as the values of the feedback gain for the dead-zone period and for the period during which the motor torque is transmitted to the drive-shaft torque of the vehicle.

2. The control method according to claim 1, wherein the drive-shaft torsional angular velocity is calculated from a deviation between a drive-wheel rotation angular velocity and a drive-shaft converted value of a motor rotation angular velocity.

3. The control method according to claim 1,
   wherein the drive-shaft torsional angular velocity is a drive-shaft torsional angular velocity estimated value that is estimated from the target torque command value by use of the vehicle model;
   wherein a drive-shaft torsional angle estimated value is calculated from the target torque command value by use of the vehicle model; and
   wherein the final torque command value is set based on the target torque command value, the drive-shaft torsional angle estimated value, and a value obtained by multiplying the drive-shaft torsional angular velocity estimated value by the feedback gain.

4. The control method according to claim 3,
wherein the dead-zone period is estimated by a motor controller included in the vehicle model; and
wherein the drive-shaft torsional angular velocity estimated value is estimated by the motor controller included in the vehicle model.

5. The control method according to claim 1, wherein the feedback gain for the dead-zone period is set to a value smaller than the feedback gain for the period during which the motor torque is transmitted to the drive-shaft torque of the vehicle.

6. The control method according to claim 1, wherein a delay element included in a control system is added to the vehicle model.

7. The control method according to claim 6, wherein the delay element included in the control system includes at least one time delay out of a time delay caused when a vehicle state is detected and a predetermined process is performed, a time delay required for computing until the final torque command value is calculated from the target torque command value, and a time delay until the motor torque is actually generated to the final torque command value.

8. The control method according to claim 1, further comprising:
estimating a disturbance torque applied to the motor;
detecting a speed parameter proportional to a running speed of the electric vehicle;
calculating a first torque target value as the target torque command value;
calculating a second torque target value that converges to the disturbance torque along with a decrease of the speed parameter;
comparing a magnitude of the first torque target value with that of the second torque target value; and
setting, when the second torque target value is larger than the first torque target value, as the final torque command value, a value obtained by performing the vibration damping control on the second torque target value, and determining that the vehicle is just before stop of the vehicle.

9. The control method according to claim 1, comprising:
estimating a disturbance torque applied to the motor;
detecting a speed parameter proportional to a running speed of the electric vehicle; and
determining that the vehicle is just before the stop of the vehicle, when the motor torque converges to the disturbance torque along with a decrease of the speed parameter.

10. The control method according to claim 1, comprising:
detecting a speed parameter proportional to a running speed of the electric vehicle; and
determining that the vehicle is just before the stop of the vehicle, when an absolute value of the speed parameter is a predetermined value or less.

11. A control device for an electric vehicle, comprising:
a motor controller programmed to:
control a torque of a motor based on a final torque command value by calculating the final torque command value such that a vibration damping control to reduce vibrations of a driving force transmission system of a vehicle is performed on a target torque command value set based on vehicle information;
calculate the final torque command value based on the target torque command value and a value obtained by multiplying a drive-shaft torsional angular velocity by a feedback gain, and
estimate a dead-zone period during which a motor torque output from the motor is not transmitted to a drive-shaft torque of the vehicle, by use of a vehicle model that models the driving force transmission system, and
determine whether or not the vehicle is just before stop of the vehicle,
wherein different values as the feedback gain are set separately for the dead-zone period and for a period during which the motor torque is transmitted to the drive-shaft torque of the vehicle, and
wherein, when motor controller determines that the vehicle is just before the stop of the vehicle, the motor controller sets the same value as the values of the feedback gain for the dead-zone period and for the period during which the motor torque is transmitted to the drive-shaft torque of the vehicle.

* * * * *